(12) United States Patent
Lukan et al.

(10) Patent No.: US 12,446,629 B2
(45) Date of Patent: Oct. 21, 2025

(54) SECURITY TAG

(71) Applicant: RAI STRATEGIC HOLDINGS, INC., Winston-Salem, NC (US)

(72) Inventors: Sean Lukan, Winston-Salem, NC (US); Vincent Ireland, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 506 days.

(21) Appl. No.: 17/777,927

(22) PCT Filed: Oct. 27, 2020

(86) PCT No.: PCT/US2020/057499
§ 371 (c)(1),
(2) Date: May 18, 2022

(87) PCT Pub. No.: WO2021/101673
PCT Pub. Date: May 27, 2021

(65) Prior Publication Data
US 2023/0024704 A1    Jan. 26, 2023

Related U.S. Application Data

(60) Provisional application No. 62/937,003, filed on Nov. 18, 2019.

(51) Int. Cl.
*A24F 40/49* (2020.01)
*A24F 40/50* (2020.01)
*A24F 40/65* (2020.01)

(52) U.S. Cl.
CPC .............. *A24F 40/49* (2020.01); *A24F 40/50* (2020.01); *A24F 40/65* (2020.01)

(58) Field of Classification Search
CPC ........ A61M 15/0081; A61M 2205/276; A61M 15/06; A24F 40/49; A24F 40/50; A24F 40/65
See application file for complete search history.

(56) References Cited

U.S. PATENT DOCUMENTS 6,145,703 A    11/2000  Opperman
7,009,519 B2    3/2006  Leonard et al.
(Continued)

FOREIGN PATENT DOCUMENTS

GB    2272987 A    6/1994
JP    2006507196 A    3/2006
(Continued)

OTHER PUBLICATIONS

Office Action issued in corresponding Russian Application No. 2022113015 on Feb. 6, 2024, all enclosed pages cited.
(Continued)

*Primary Examiner* — Margaret M Luarca
(74) *Attorney, Agent, or Firm* — BURR & FORMAN

(57) ABSTRACT

A security tag can prohibit unauthorized usage of a device or product. The device may include an electronic nicotine delivery systems ("ENDS") device, which may include aerosol delivery devices such as smoking articles that produce aerosol. The security tag can prevent usage until authorized. Attempts at usage without authorization can result in the device being unusable. The authorization may include identity confirmation or age verification.

25 Claims, 16 Drawing Sheets

(56) References Cited

U.S. PATENT DOCUMENTS

| | | | |
|---|---|---|---|
| 2010/0163063 A1 | 7/2010 | Fernando et al. | |
| 2010/0300159 A1* | 12/2010 | Berg | C09J 163/00 |
| | | | 252/511 |
| 2011/0277780 A1 | 11/2011 | Terry et al. | |
| 2011/0290242 A1* | 12/2011 | Bach | A61M 15/0036 |
| | | | 128/200.21 |
| 2015/0249478 A1 | 9/2015 | Greiner | |
| 2016/0337362 A1 | 11/2016 | Cameron | |
| 2018/0093054 A1 | 4/2018 | Bowen et al. | |
| 2018/0296778 A1 | 10/2018 | Hacker | |

FOREIGN PATENT DOCUMENTS

| | | |
|---|---|---|
| JP | 2008541808 A | 11/2008 |
| JP | 2012513750 A | 6/2012 |
| JP | 2019521739 A | 8/2019 |
| RU | 2680224 C2 | 2/2019 |
| RU | 2697234 C1 | 8/2019 |
| WO | 2006125577 A2 | 11/2006 |
| WO | 2018092035 A1 | 5/2018 |
| WO | 2018165758 A1 | 9/2018 |
| WO | 2019126805 A1 | 6/2019 |

OTHER PUBLICATIONS

Extended European Search Report issued in corresponding European Application No. 20890821.0 on Nov. 14, 2023, all enclosed pages cited.

International Search Report and Written Opinion dated Jan. 26, 2021 in PCT/US20/57499 filed Oct. 27, 2020.

Notice of Allowance issued in corresponding Japanese Application No. 20221-528621 on Oct. 22, 2024, all enclosed pages cited.

* cited by examiner

100

SECURITY TAG

TECHNOLOGICAL FIELD

The present disclosure relates to a security tag or security mechanism for securing usage of a device. The device may be an electronic nicotine delivery systems ("ENDS") device, including aerosol delivery devices such as smoking articles that produce aerosol. Usage may be secured by the security tag for authentication of a user, including age verification.

BACKGROUND

Many devices have been proposed through the years as improvements upon, or alternatives to, smoking products that require combusting tobacco for use. Some example alternatives have included devices wherein a solid or liquid fuel is combusted to transfer heat to tobacco or wherein a chemical reaction is used to provide such heat source. Additional example alternatives use electrical energy to heat tobacco and/or other aerosol generating substrate materials, such as described in U.S. Pat. No. 9,078,473 to Worm et al., which is incorporated herein by reference. Generally, a device using electrical energy to heat tobacco or other substances may be referred to as an electronic nicotine delivery systems ("ENDS") device.

Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous alternative smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., U.S. Pat. App. Pub. No. 2015/0059780 to Davis et al., and U.S. patent application Ser. No. 15/222,615 to Watson et al., filed Jul. 28, 2016, all of which are incorporated herein by reference. See also, for example, the various implementations of products and heating configurations described in the background sections of U.S. Pat. No. 5,388,594 to Counts et al. and 8,079,371 to Robinson et al., which are incorporated by reference.

The smoking articles described above may be subject to certain restrictions, including identify verification and/or age restrictions. An improved process is needed for securing the device from unauthorized usage.

BRIEF SUMMARY

The present disclosure relates to a security tag that prohibits unauthorized usage of a device or product. The device may include an electronic nicotine delivery systems ("ENDS") device, which may include aerosol delivery devices such as smoking articles that produce aerosol. The tag can prevent usage until authorized. In other words, the device is locked and cannot be used until being properly unlocked. The locking mechanism is referred to as a security tag, though the term "tag" is not intended in any manner to limit the shape or form factor of the locking mechanism, as the disclosure contemplates "security tag" taking on a variety of shapes or forms depending on the form factor and features of the device to be locked. The security tag may also be referred to as a security mechanism or locking mechanism and is intended to cover securing a device. Attempts at usage without authorization can result in the device being unusable. Specifically, removal of the security tag of some embodiments without the proper authorization can result in the device being rendered non-functional, or even damaged. The authorization may include identity confirmation or age verification.

It will be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings, which illustrate, by way of example, the principles of some described example implementations.

BRIEF DESCRIPTION OF THE FIGURES

Figure 1:
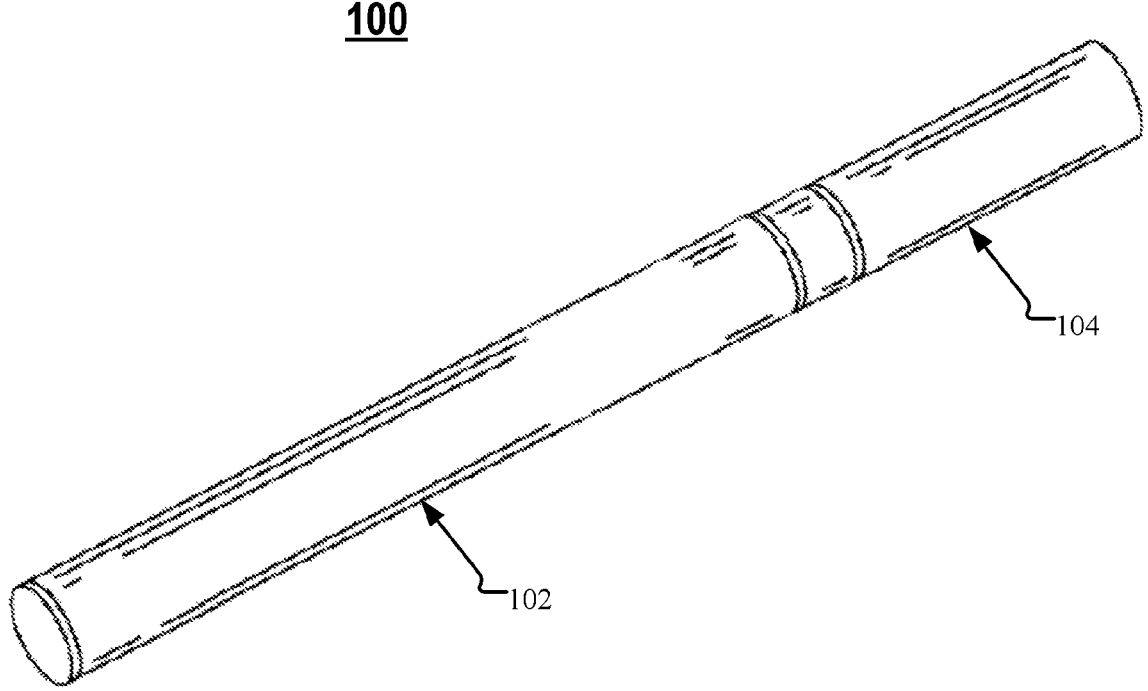
Figure 2:
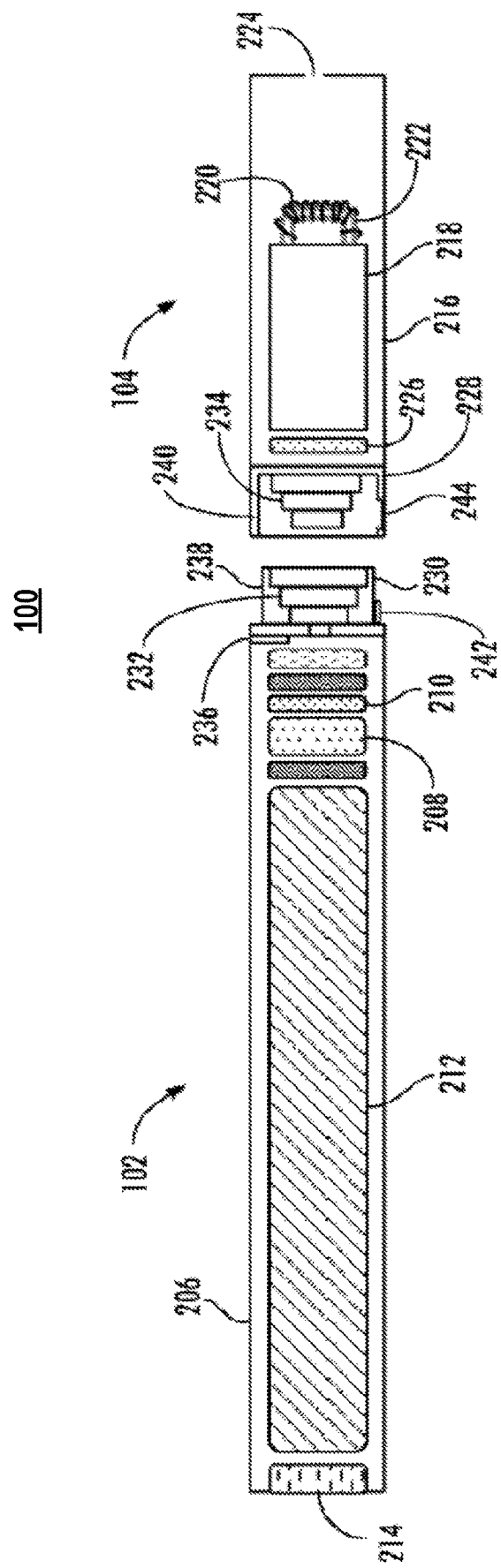
Figure 3:
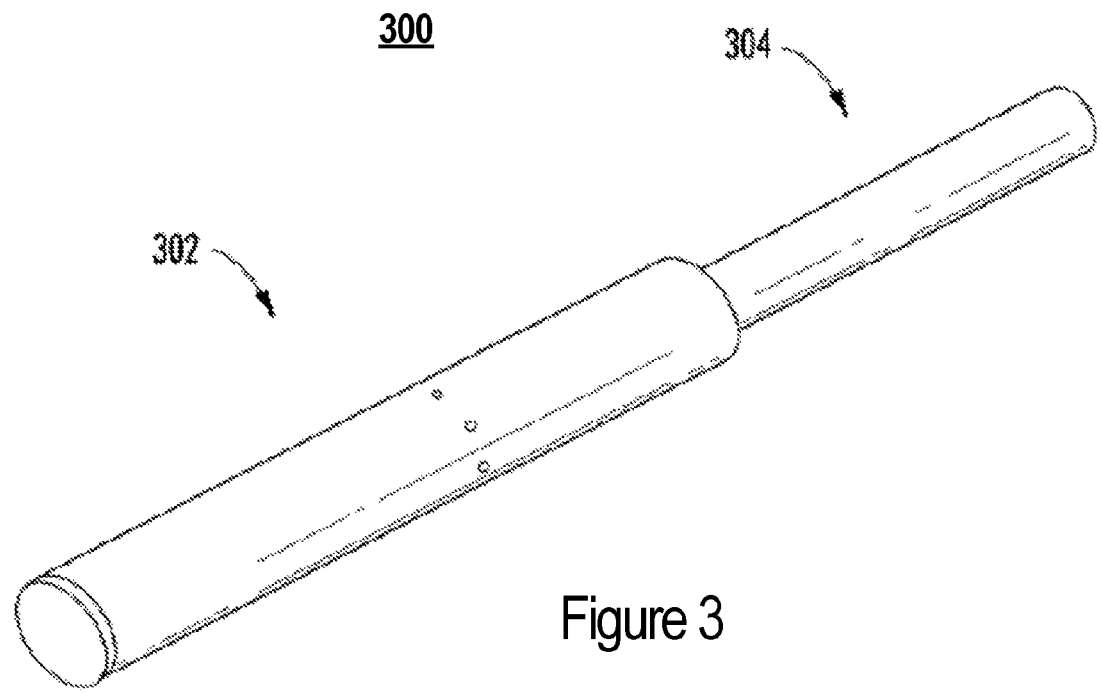
Figure 4:
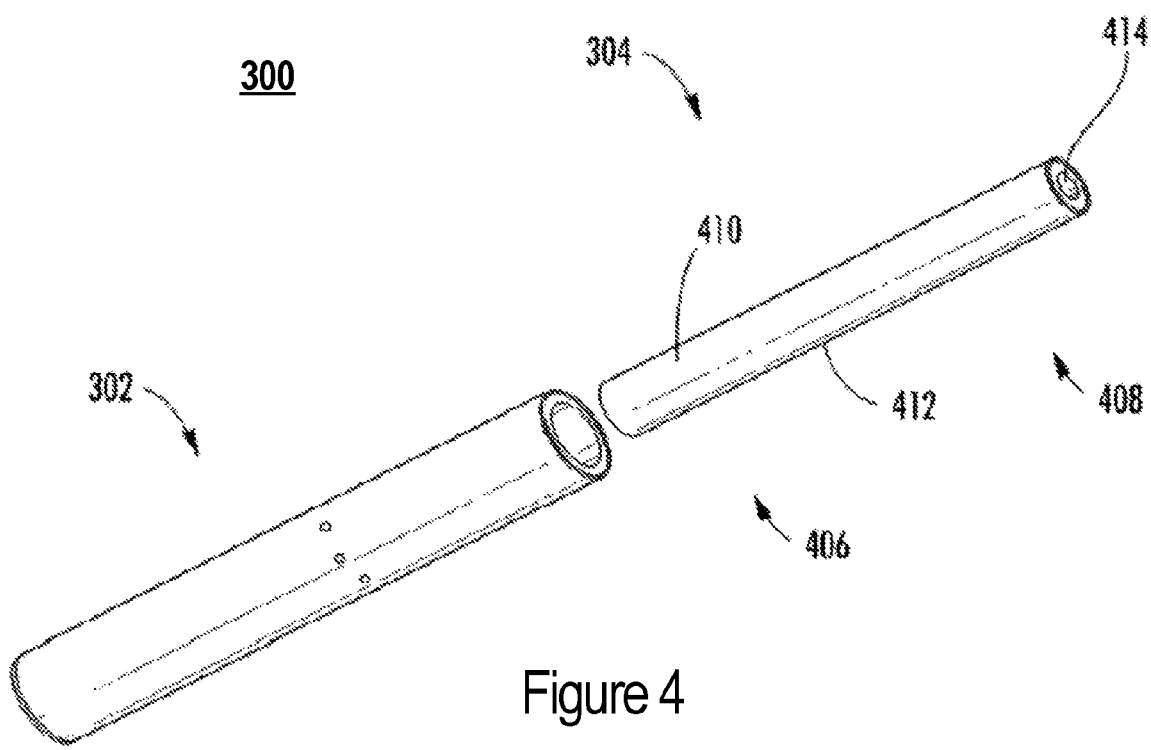
Figure 5:
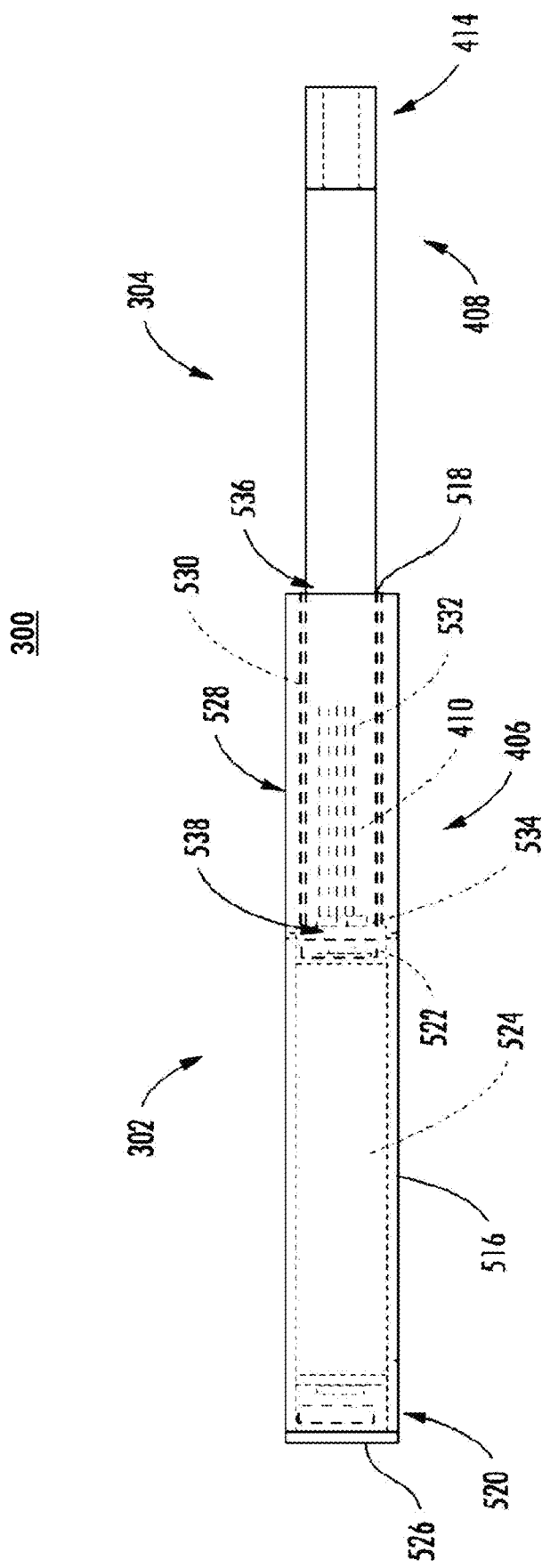
Figure 6:
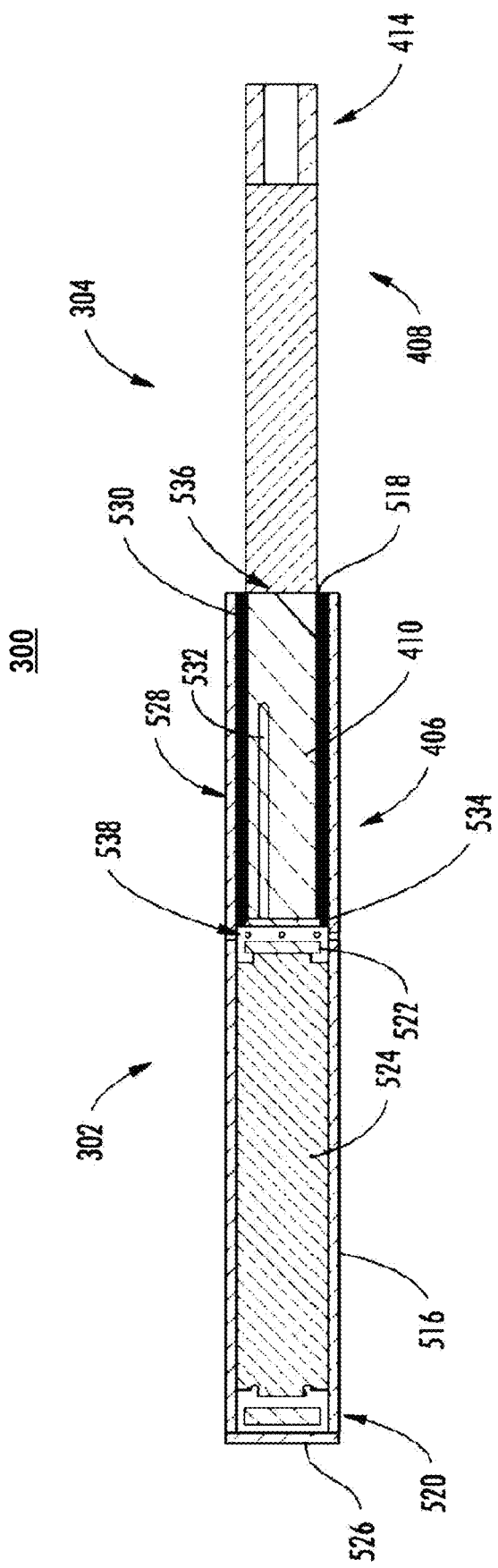
Figure 7:
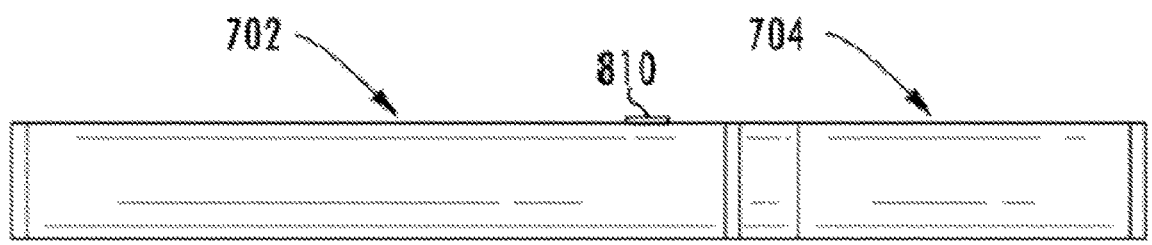
Figure 8:
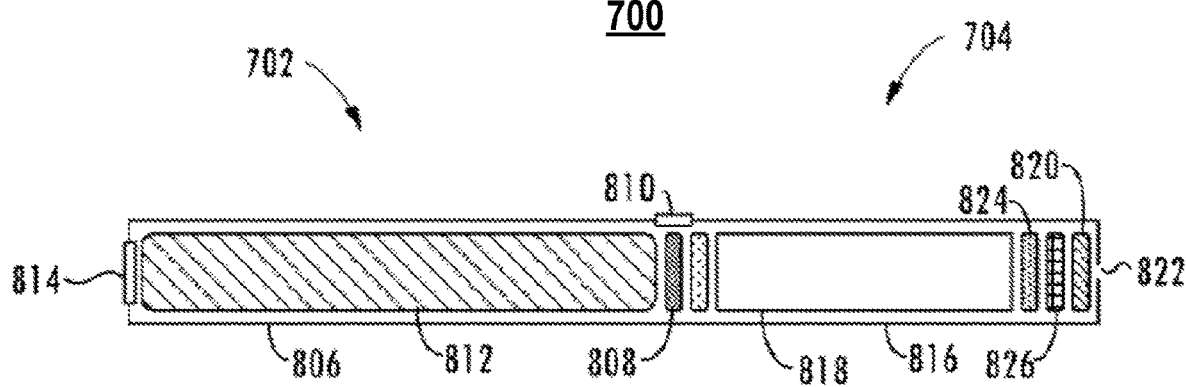
Figure 9:
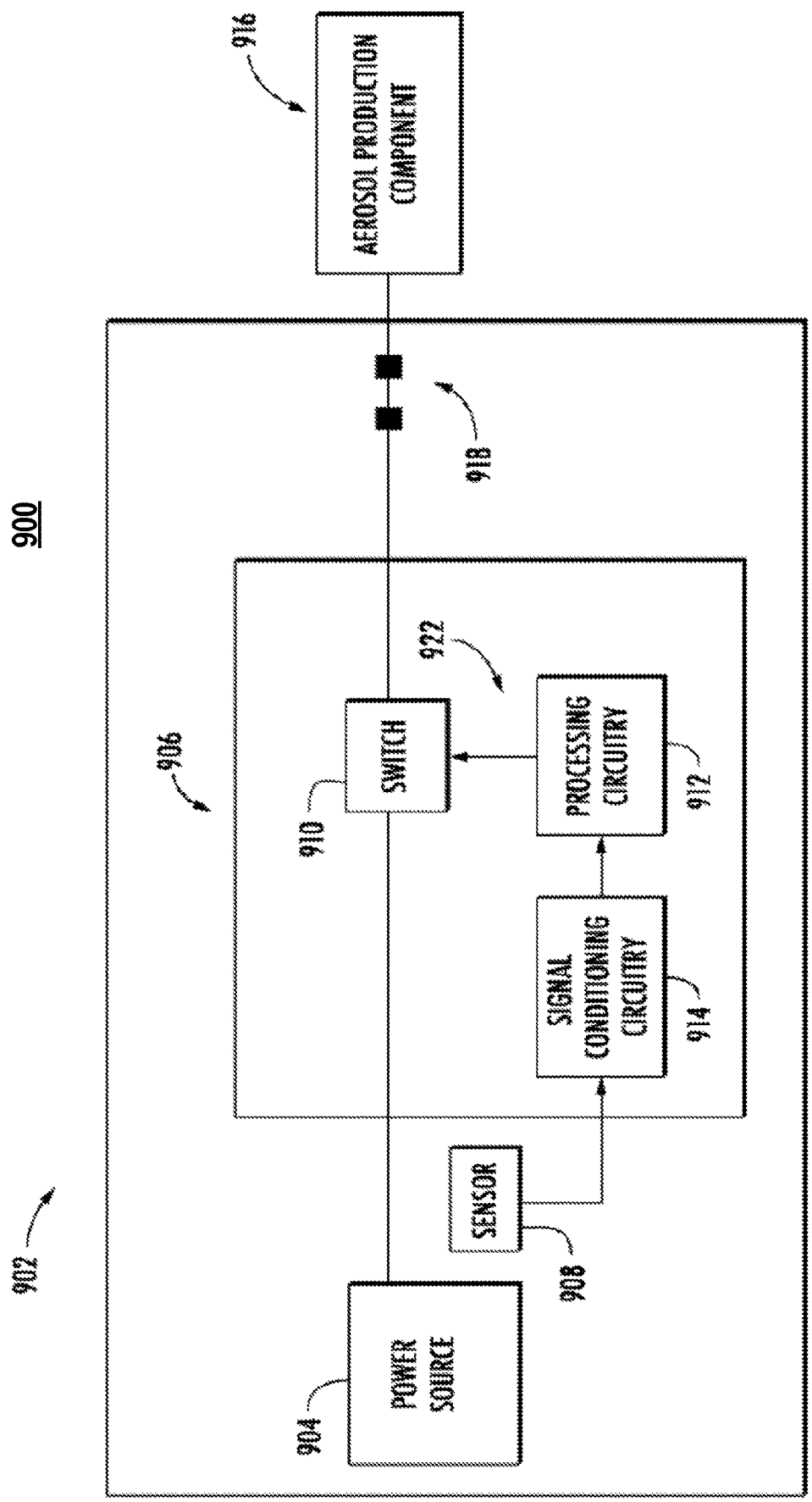
Figure 10:
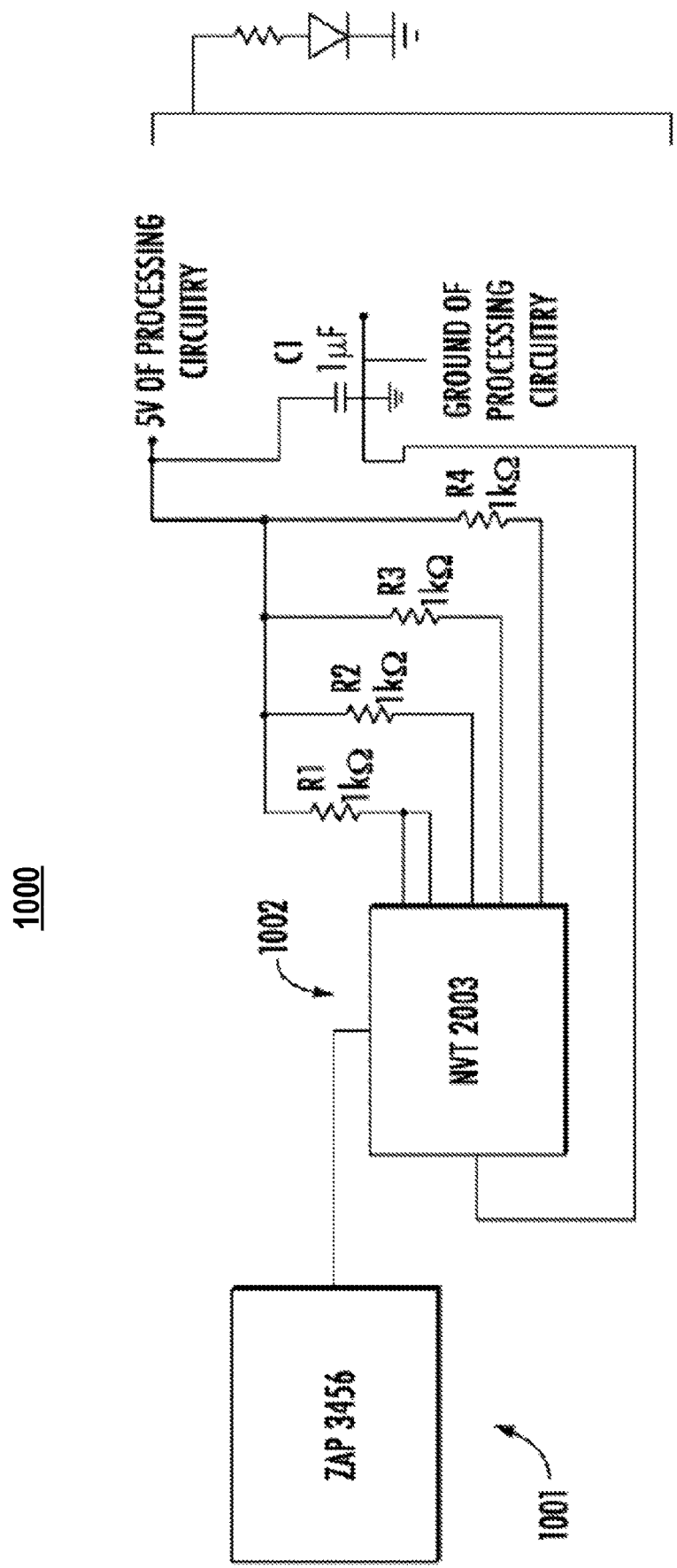

Having thus described aspects of the disclosure in the foregoing general terms, reference will now be made to the accompanying figures, which are not necessarily drawn to scale, and wherein:

FIG. 1 illustrates a perspective view of an aerosol delivery device including a cartridge and a control body that are coupled to one another, according to an example implementation of the present disclosure;

FIG. 2 is a partially cut-away view of the aerosol delivery device of FIG. 1 in which the cartridge and control body are decoupled from one another, according to an example implementation;

FIGS. 3 and 4 illustrate a perspective view of an aerosol delivery device comprising a control body and an aerosol source member that are respectively coupled to one another and decoupled from one another, according to another example implementation of the present disclosure;

FIGS. 5 and 6 illustrate respectively a front view of and a sectional view through the aerosol delivery device of FIGS. 3 and 4, according to an example implementation;

FIGS. 7 and 8 illustrate respectively a side view and a partially cut-away view of an aerosol delivery device including a cartridge coupled to a control body, according to example implementations;

FIG. 9 illustrates a circuit diagram of an aerosol delivery device according to various example implementations of the present disclosure; and FIG. 10 illustrates a circuit diagram of signal conditioning circuitry according to an example implementation of the present disclosure.

Figure 11:
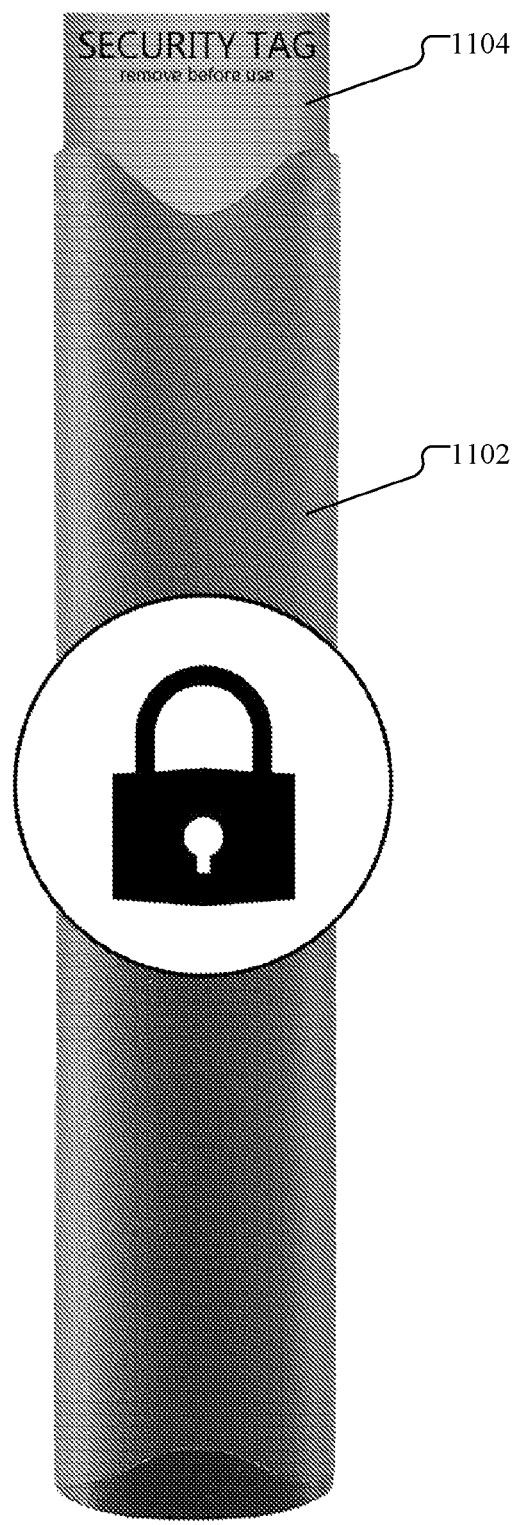

FIG. 11 is an example security tag on a device.

Figure 12:
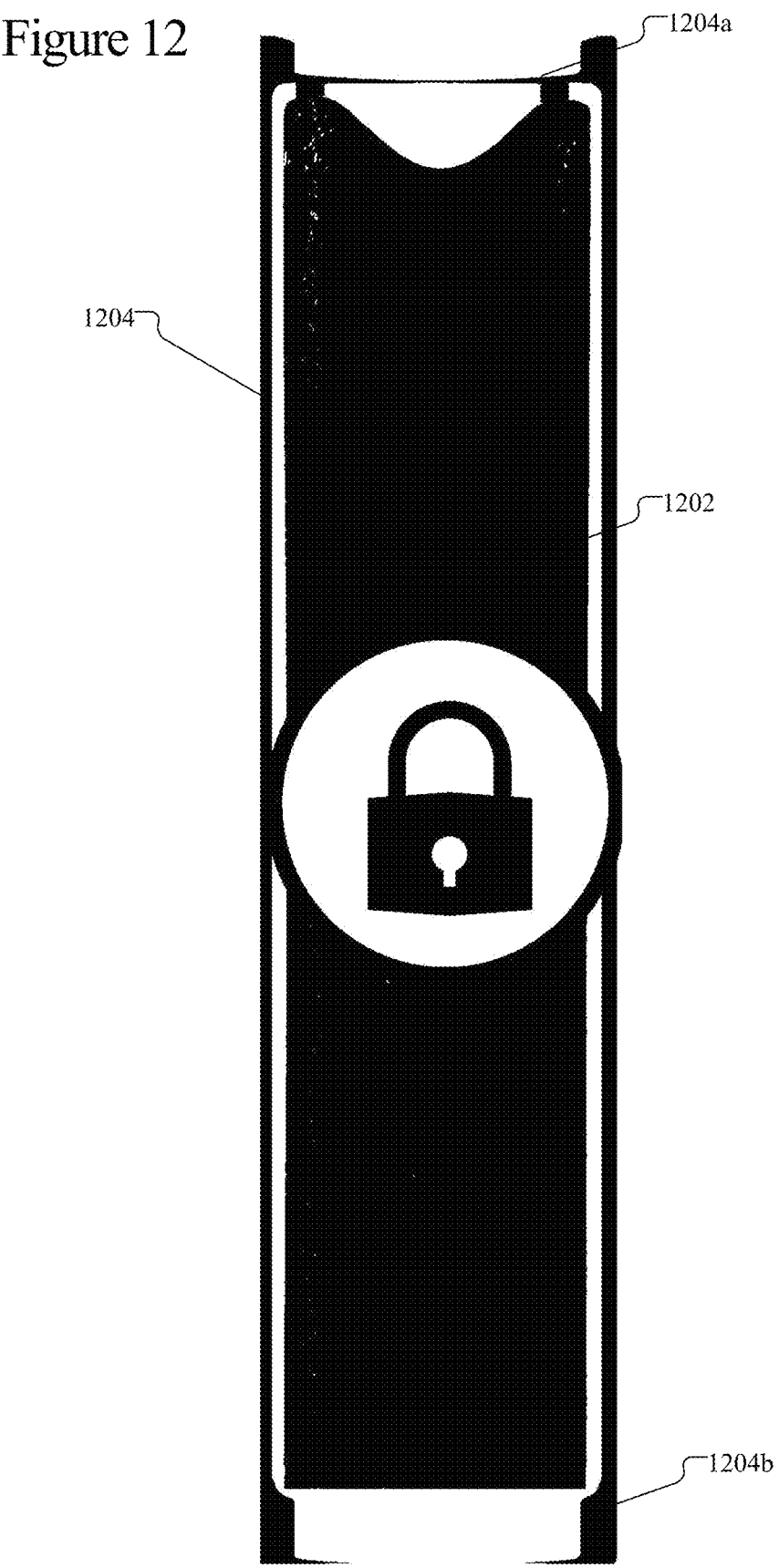

FIG. 12 is another example security tag on a device.

Figure 13:
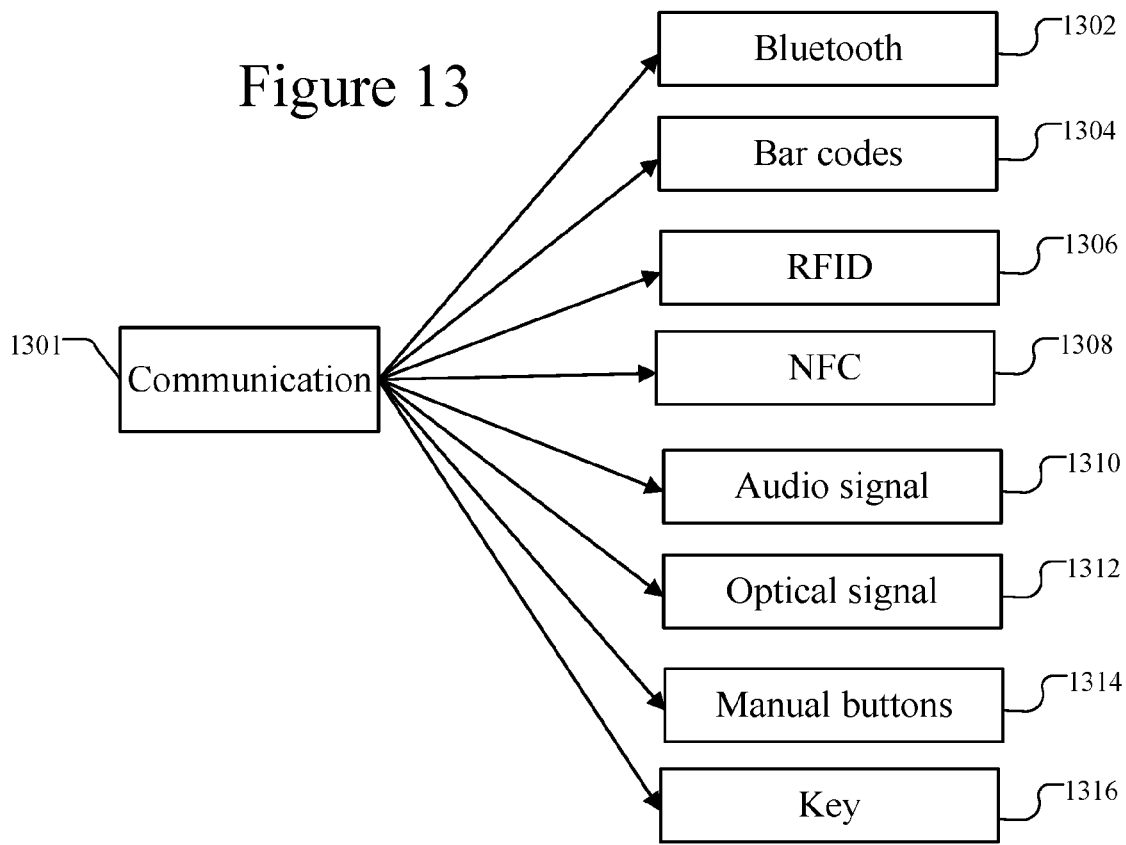

FIG. 13 illustrates communication examples.

Figure 14:
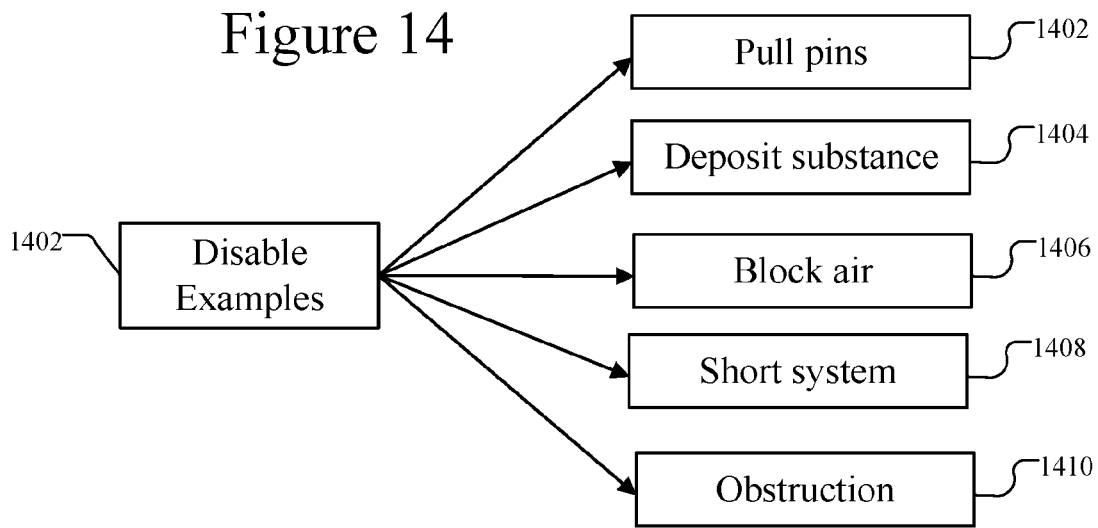

FIG. 14 illustrates examples in which a device can be disabled with improper removal of a security tag.

Figure 15:
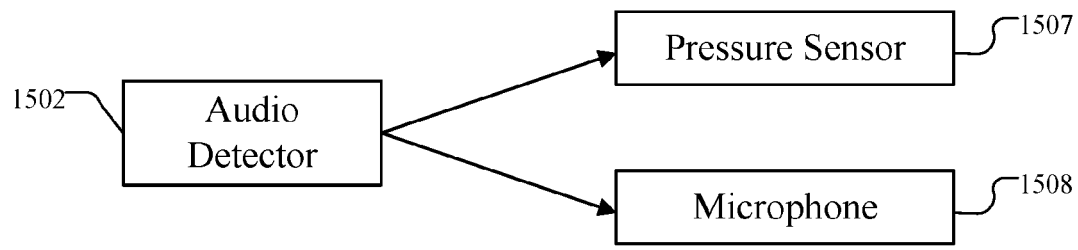

FIG. 15 illustrates embodiments of how an audio signal can be communicated with an audio detector.

Figure 16:
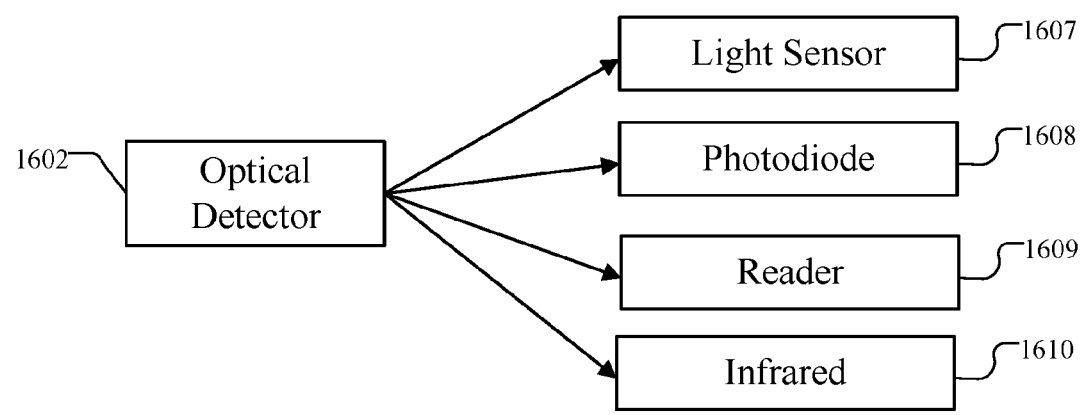

FIG. 16 illustrates embodiments of how an optical/visual signal can be communicated with an optical detector.

Figure 17:
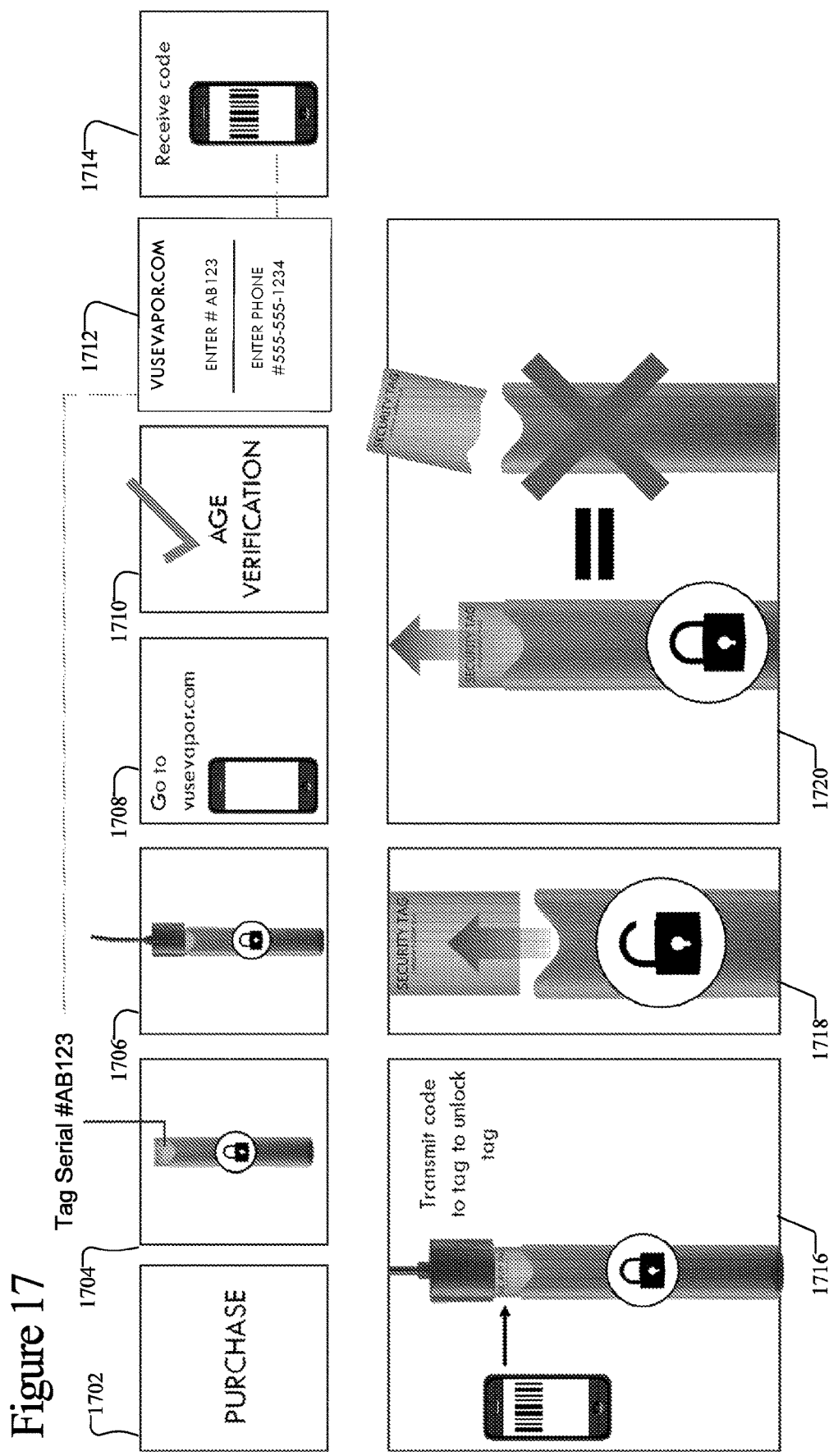

FIG. 17 is a diagram showing a security tag process according to one embodiment.

Figure 18:
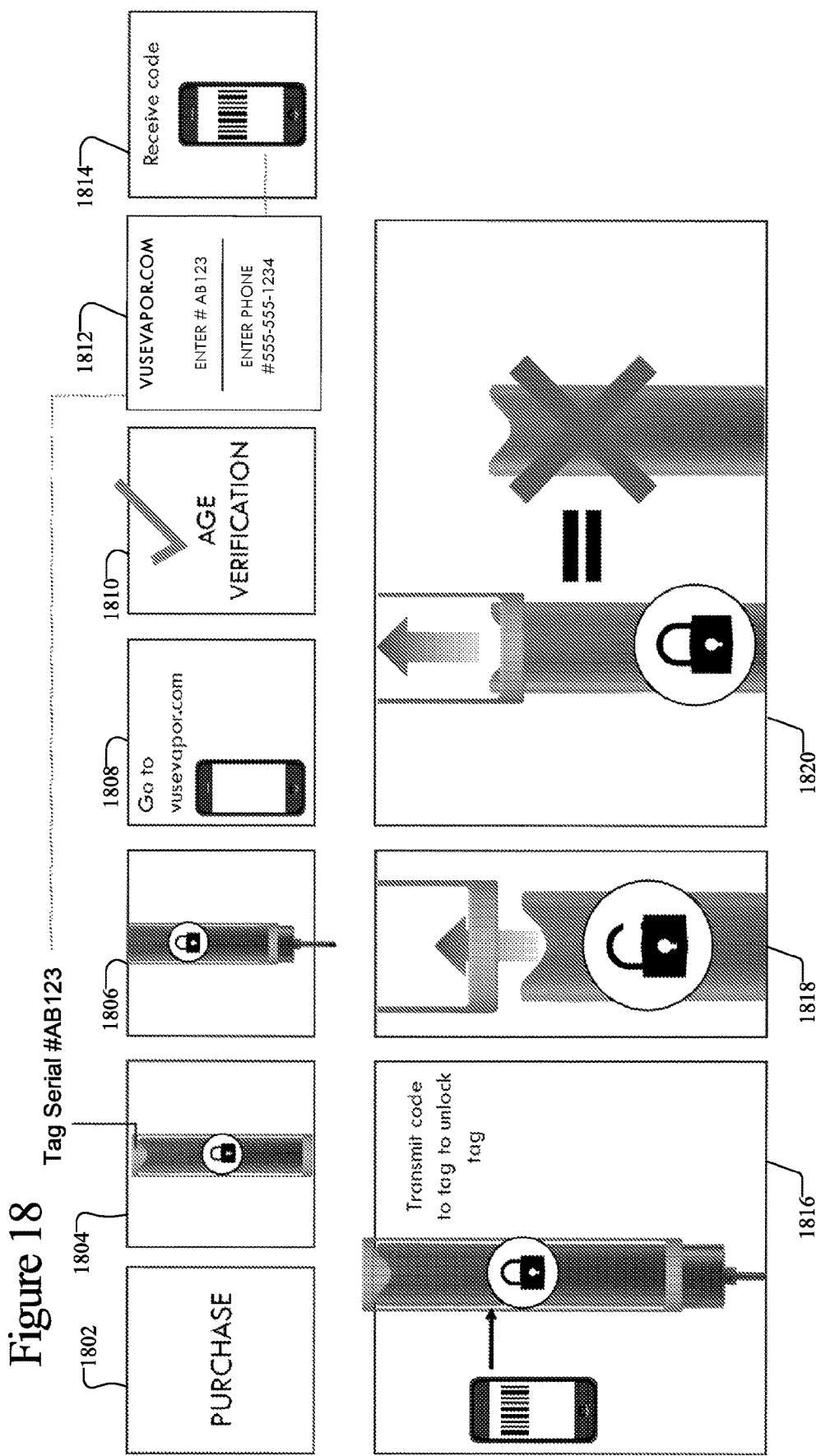

FIG. 18 is a diagram showing a security tag process according to another embodiment.

Figure 19:
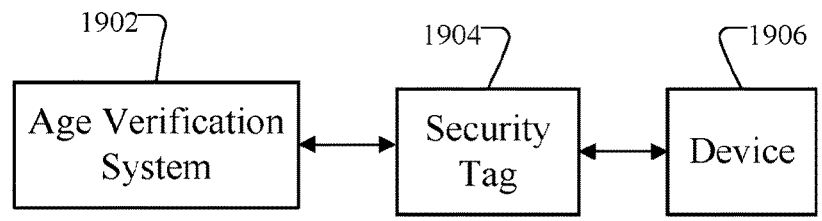

FIG. 19 illustrates a system diagram for age verification with a security tag.

Figure 20:
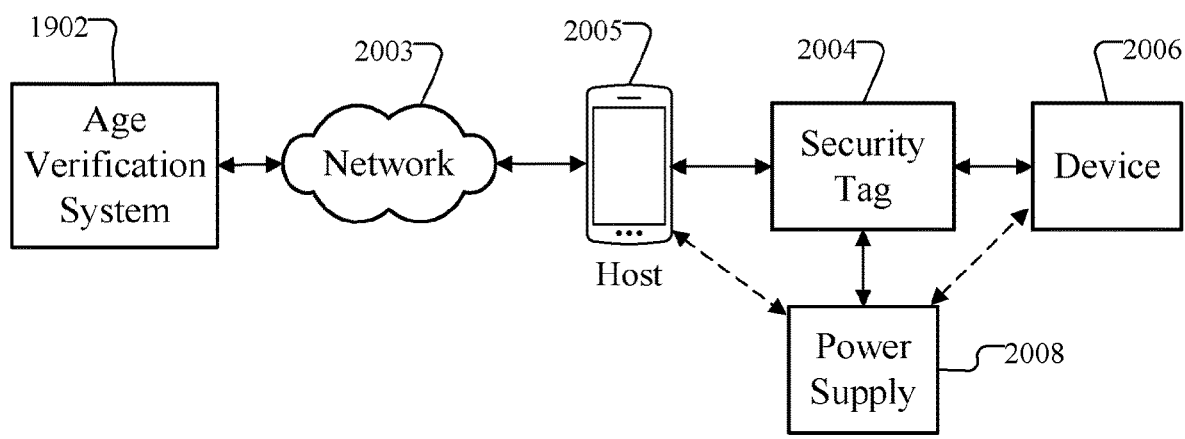

FIG. 20 illustrates another embodiment of the age verification system connected over a network with a host.

Figure 21:
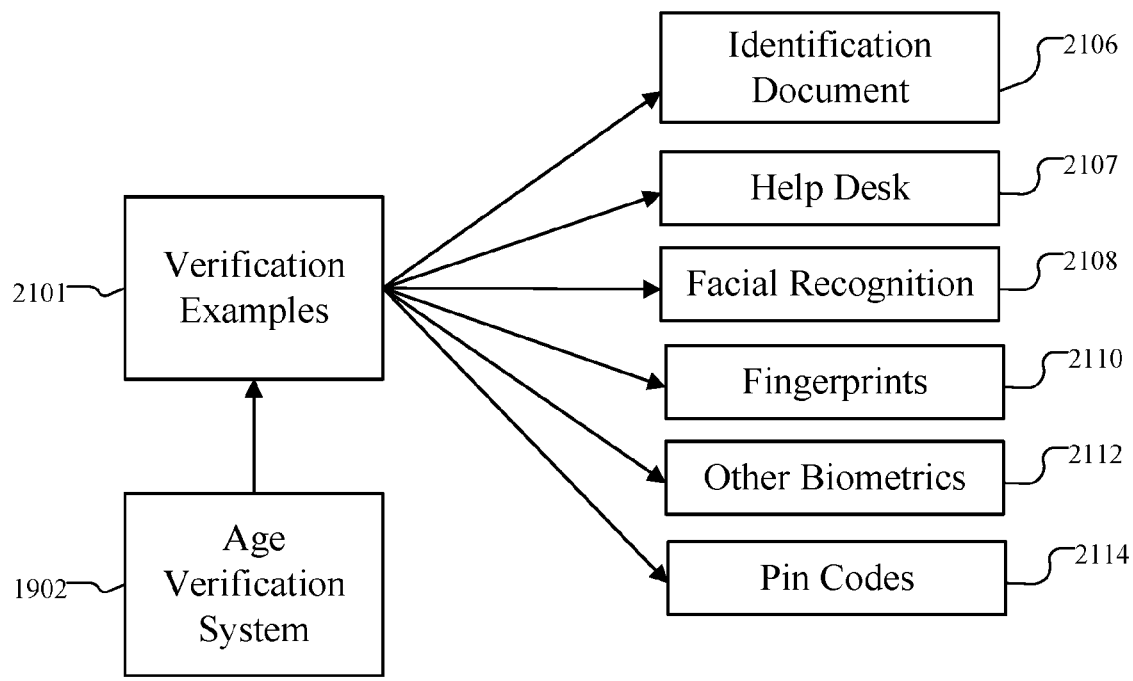

FIG. 21 illustrates verification examples from the age verification system.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, the present disclosure relates to a security tag, which is a security mechanism that prevents usage or access to a particular device or product without proper authentication. In one embodiment, the authentication may include identifying the user as a purchaser of the device or product, or may be verifying an age of the user when the device or product us age restricted. In one embodiment, the device may be an electronic nicotine delivery systems ("ENDS") device, which may include aerosol delivery devices. ENDS is one example of such a device or product that may be associated with restriction, such as an age restriction. Other examples include delivery devices for Tetrahydrocannabinol (THC), Cannabidiol (CBD), botanicals, medicinals, and/or other active ingredients. Thus, it will be appreciated that while an ENDS device, such as an aerosol delivery device, is used as an example application of various embodiments throughout, this example is intended to be non-limiting such that inventive concepts disclosed herein can be used with a variety of products or devices other than ENDS devices, including aerosol delivery devices that may be used to deliver other medicinal and/or active ingredients to a user or may include smokeless tobacco or other tobacco products. FIGS. 1-10 illustrate examples of some devices, that may be secured and/or authenticated using the security tag of various embodiments.

In another embodiment, the security tag may be used for authenticating a purchaser of the product. The security tag provides functionality for authentication, which may be based on age verification, because such devices may be restricted based on age or other factors that require some form of authentication, verification, and/or identification. Authentication of a user's identity may reduce counterfeiting or other undesirable uses of a product. Although there may be many reasons for having a security tag to limit or control access, one example described below is for age verification to ensure that an underage user cannot use an age-restricted product. Although described in detail below, age verification is merely one example of the utility of the security tag. The security tag may prevent usage and/or disable usage unless authentication is performed. Authentication is further described below and may include an age verification, but may also include authenticating a purchaser, a user, or authenticating a product.

The security tag may also be referred to as a security mechanism and includes various embodiments that prevent usage or access to a device. In some embodiments, the security tag can prevent usage or access without modifying the functionality of the device. In other words, the device is unchanged but the security tag can operate to prevent usage. In addition, the security tag can disable the device if removed improperly. Although age verification is one reason for securing the device with a security tag, theft prevention, user authentication/identification, and/or product authentication could be provided by securing the device with a security tag.

Aerosol delivery devices are one example of a product or device that relies on a security tag. Other devices or products may be used with the security tag, including other age restricted devices or products. As one example, various aerosol delivery devices are further described with respect to FIGS. 1-10. They may be configured to produce an aerosol (an inhalable substance) from an aerosol precursor composition (sometimes referred to as an inhalable substance medium). The aerosol precursor composition may comprise one or more of a solid tobacco material, a semi-solid tobacco material, a liquid aerosol precursor composition, or a gel aerosol precursor composition. In some implementations, the aerosol delivery devices may be configured to heat and produce an aerosol from a fluid aerosol precursor composition (e.g., a liquid aerosol precursor composition). Additionally or alternatively, the aerosol precursor composition may comprise one or more substances mentioned above, including but not limited to botanical substances, medicinal substances, alcohol, glycerin, and may include nicotine, Tetrahydrocannabinol (THC), Cannabidiol (CBD), or other active ingredients. Such aerosol delivery devices may include so-called electronic cigarettes. In other implementations, the aerosol delivery devices may comprise heat-not-burn devices. In yet other implementations, the aerosol delivery devices may comprise no-heat-no-burn devices.

Liquid aerosol precursor composition, also referred to as a vapor precursor composition or "e-liquid," is particularly useful for electronic cigarettes and no-heat-no-burn devices. Liquid aerosol precursor composition may comprise a variety of components including, by way of example, a polyhydric alcohol (e.g., glycerin, propylene glycol, or a mixture thereof), nicotine, tobacco, tobacco extract, and/or flavorants. In some examples, the aerosol precursor composition comprises glycerin and nicotine. In other examples, the composition may additionally or alternatively include alcohol, other botanical substances, other medicinal substances, or may include Tetrahydrocannabinol (THC), Cannabidiol (CBD), or other active ingredients, or some combination thereof.

Some liquid aerosol precursor compositions that may be used in conjunction with various implementations may include one or more acids such as levulinic acid, succinic acid, lactic acid, pyruvic acid, benzoic acid, fumaric acid, combinations thereof, and the like. Inclusion of an acid(s) in liquid aerosol precursor compositions including nicotine may provide a protonated liquid aerosol precursor composition, including nicotine in salt form. Representative types of liquid aerosol precursor components and formulations are set forth and characterized in U.S. Pat. No. 7,726,320 to Robinson et al.; U.S. Pat. No. 9,254,002 to Chong et al.; and U.S. Pat. App. Pub. Nos. 2013/0008457 to Zheng et al., 2015/0020823 to Lipowicz et al., and 2015/0020830 to Koller; as well as PCT Pat. App. Pub. No. WO 2014/182736 to Bowen et al.; and U.S. Pat. No. 8,881,737 to Collett et al., the disclosures of which are incorporated herein by reference. Other aerosol precursors that may be employed include the aerosol precursors that have been incorporated in any of a number of the representative products identified above. Also desirable are the so-called "smoke juices" for electronic cigarettes that have been available from Johnson Creek Enterprises LLC. Still further example aerosol precursor compositions are sold under the brand names BLACK NOTE, COSMIC FOG, THE MILKMAN E-LIQUID, FIVE PAWNS, THE VAPOR CHEF, VAPE WILD, BOOSTED, THE STEAM FACTORY, MECH SAUCE, CASEY JONES MAINLINE RESERVE, MITTEN VAPORS, DR. CRIMMY'S V-LIQUID, SMILEY E LIQUID, BEANTOWN VAPOR, CUTTWOOD, CYCLOPS VAPOR, SICBOY, GOOD LIFE VAPOR, TELEOS, PINUP VAPORS, SPACE JAM, MT. BAKER VAPOR, and JIMMY THE JUICE MAN. Implementations of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al.; U.S. Pat. No. 8,627,828 to Strickland et al.; and U.S. Pat. No. 9,307,787 to Sun et al.; as well as U.S. Pat. App. Pub. Nos. 2010/0018539 to Brinkley et al., and PCT Pat. App. Pub. No. WO 97/06786 to Johnson et al., all of which are incorporated by reference herein.

Representative types of substrates, reservoirs or other components for supporting the aerosol precursor are described in U.S. Pat. No. 8,528,569 to Newton; U.S. Pat. App. Pub. No. 2014/0261487 to Chapman et al.; U.S. Pat. App. Pub. No. 2015/0059780 to Davis et al.; and U.S. Pat. App. Pub. No. 2015/0216232 to Bless et al., all of which are incorporated herein by reference. Additionally, various wicking materials, and the configuration and operation of those wicking materials within certain types of electronic cigarettes, are set forth in U.S. Pat. No. 8,910,640 to Sears et al., which is incorporated herein by reference.

In other implementations, the aerosol delivery devices may comprise heat-not-burn devices, configured to heat a solid aerosol precursor composition (e.g., an extruded tobacco rod) or a semi-solid aerosol precursor composition (e.g., a glycerin-loaded tobacco paste). The aerosol precursor composition may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017/0000188 to Nordskog et al., all of which are incorporated by reference herein. Further representative types of solid and semi-solid aerosol precursor compositions and arrangements include those found in the NEOSTIKS™ consumable aerosol source members for the GLO™ product by British American Tobacco and in the HEETS™ consumable aerosol source members for the IQOS™ product by Philip Morris International, Inc.

In various implementations, the inhalable substance specifically may be a tobacco component or a tobacco-derived material (i.e., a material that is found naturally in tobacco that may be isolated directly from the tobacco or synthetically prepared). For example, the aerosol precursor composition may comprise tobacco extracts or fractions thereof combined with an inert substrate. The aerosol precursor composition may further comprise unburned tobacco or a composition containing unburned tobacco that, when heated to a temperature below its combustion temperature, releases an inhalable substance. In some implementations, the aerosol precursor composition may comprise tobacco condensates or fractions thereof (i.e., condensed components of the smoke produced by the combustion of tobacco, leaving flavors and, possibly, nicotine).

Tobacco materials useful in the present disclosure can vary and may include, for example, flue-cured tobacco, burley tobacco, Oriental tobacco or Maryland tobacco, dark tobacco, dark-fired tobacco and *Rustica* tobaccos, as well as other rare or specialty tobaccos, or blends thereof. Tobacco materials also can include so-called "blended" forms and processed forms, such as processed tobacco stems (e.g., cut-rolled or cut-puffed stems), volume expanded tobacco (e.g., puffed tobacco, such as dry ice expanded tobacco (DIET), preferably in cut filler form), reconstituted tobaccos (e.g., reconstituted tobaccos manufactured using paper-making type or cast sheet type processes). Various representative tobacco types, processed types of tobaccos, and types of tobacco blends are set forth in U.S. Pat. No. 4,836,224 to Lawson et al., U.S. Pat. No. 4,924,888 to Perfetti et al., U.S. Pat. No. 5,056,537 to Brown et al., U.S. Pat. No. 5,159,942 to Brinkley et al., U.S. Pat. No. 5,220,930 to Gentry, U.S. Pat. No. 5,360,023 to Blakley et al., U.S. Pat. No. 6,701,936 to Shafer et al., U.S. Pat. No. 7,011,096 to Li et al., U.S. Pat. No. 7,017,585 to Li et al., and U.S. Pat. No. 7,025,066 to Lawson et al.; U.S. Pat. App. Pub. No. 2004/0255965 to Perfetti et al.; PCT Pat. App. Pub. No. WO 02/37990 to Bereman; and Bombick et al., Fund. Appl. Toxicol., 39, p. 11-17 (1997), which are incorporated herein by reference. Further example tobacco compositions that may be useful in a smoking device, including according to the present disclosure, are disclosed in U.S. Pat. No. 7,726,320 to Robinson et al., which is incorporated herein by reference.

Still further, the aerosol precursor composition may comprise an inert substrate having the inhalable substance, or a precursor thereof, integrated therein or otherwise deposited thereon. For example, a liquid comprising the inhalable substance may be coated on or absorbed or adsorbed into the inert substrate such that, upon application of heat, the inhalable substance is released in a form that can be withdrawn from the inventive article through application of positive or negative pressure. In some aspects, the aerosol precursor composition may comprise a blend of flavorful and aromatic tobaccos in cut filler form. In another aspect, the aerosol precursor composition may comprise a reconstituted tobacco material, such as described in U.S. Pat. No. 4,807,809 to Pryor et al.; U.S. Pat. No. 4,889,143 to Pryor et al.; and U.S. Pat. No. 5,025,814 to Raker, the disclosures of which are incorporated herein by reference. For further information regarding suitable aerosol precursor composition, see U.S. patent application Ser. No. 15/916,834 to Sur et al., filed Mar. 9, 2018, which is incorporated herein by reference.

Regardless of the type of aerosol precursor composition, aerosol delivery devices may include an aerosol production component configured to produce an aerosol from the aerosol precursor composition. In the case of an electronic cigarette or a heat-not-burn device, for example, the aerosol production component may be or include a heating element. In other cases, devices may use aerosol production components that generate an aerosol through primarily mechanical components, such as a vibratable piezoelectric component, piezomagnetic mesh, and/or other mechanical aerosol production components.

One example of a suitable heating element is an induction heater. Such heaters often comprise an induction transmitter and an induction receiver. The induction transmitter may include a coil configured to create an oscillating magnetic field (e.g., a magnetic field that varies periodically with time) when alternating current is directed through it. The induction receiver may be at least partially located or received within the induction transmitter and may include a conductive material (e.g., ferromagnetic material or an aluminum coated material). By directing alternating current through the induction transmitter, eddy currents may be generated in the induction receiver via induction. The eddy currents flowing through the resistance of the material defining the induction receiver may heat it by Joule heating (i.e., through the Joule effect). The induction receiver, which may define an atomizer, may be wirelessly heated to form an aerosol from an aerosol precursor composition positioned in proximity to the induction receiver. Various implementations of an aerosol delivery device with an induction heater are described in U.S. Pat. App. Pub. No. 2017/0127722 to Davis et al.; U.S. Pat. App. Pub. No. 2017/0202266 to Sur et al.; U.S. patent application Ser. No. 15/352,153 to Sur et al., filed Nov. 15, 2016; U.S. patent application Ser. No. 15/799,365 to Sebastian et al., filed Oct. 31, 2017; and U.S. patent application Ser. No. 15/836,086 to Sur, all of which are incorporated by reference herein.

In other implementations including those described more particularly herein, the heating element is a conductive heater such as in the case of electrical resistance heater. These heaters may be configured to produce heat when an electrical current is directed through it. In various implementations, a conductive heater may be provided in a variety forms, such as in the form of a foil, a foam, discs, spirals, fibers, wires, films, yarns, strips, ribbons or cylinders. Such heaters often include a metal material and are configured to produce heat as a result of the electrical resistance associated with passing an electrical current through it. Such resistive heaters may be positioned in proximity to and heat an aerosol precursor composition to produce an aerosol. A variety of conductive substrates that may be usable with the present disclosure are described in the above-cited U.S. Pat. App. Pub. No. 2013/0255702 to Griffith et al.

In some implementations aerosol delivery devices may include a control body and a cartridge in the case of so-called electronic cigarettes or no-heat-no-burn devices, or a control body and an aerosol source member in the case of heat-not-burn devices. In the case of either electronic cigarettes or heat-not-burn devices, the control body may be reusable, whereas the cartridge/aerosol source member may be configured for a limited number of uses and/or configured to be disposable. Various mechanisms may connect the cartridge/aerosol source member to the control body to result in a threaded engagement, a press-fit engagement, an interference fit, a sliding fit, a magnetic engagement, or the like.

The control body and cartridge/aerosol source member may include separate, respective housings or outer bodies, which may be formed of any of a number of different materials. The housing may be formed of any suitable, structurally-sound material. In some examples, the housing may be formed of a metal or alloy, such as stainless steel, aluminum or the like. Other suitable materials include various plastics (e.g., polycarbonate), metal-plating over plastic, ceramics and the like.

The cartridge/aerosol source member may include the aerosol precursor composition. In order to produce aerosol from the aerosol precursor composition, the aerosol production component (e.g., heating element, piezoelectric/piezomagnetic mesh) may be positioned in contact with or proximate the aerosol precursor composition, such as across the control body and cartridge, or in the control body in which the aerosol source member may be positioned. The control body may include a power source, which may be rechargeable or replaceable, and thereby the control body may be reused with multiple cartridges/aerosol source members. As described below, a charger may be used for providing power to the security tag in one embodiment.

The control body may also include means to activate the aerosol delivery device such as a pushbutton, touch-sensitive surface or the like for manual control of the device. Additionally or alternatively, the control body may include a flow sensor to detect when a user draws on the cartridge/aerosol source member to thereby activate the aerosol delivery device.

In various implementations, the aerosol delivery device according to the present disclosure may have a variety of overall shapes, including, but not limited to an overall shape that may be defined as being substantially rod-like or substantially tubular shaped or substantially cylindrically shaped. In the implementations shown in and described with reference to the accompanying figures, the aerosol delivery device has a substantially round cross-section; however, other cross-sectional shapes (e.g., oval, square, rectangle, triangle, etc.) also are encompassed by the present disclosure. Such language that is descriptive of the physical shape of the article may also be applied to the individual components thereof, including the control body and the cartridge/aerosol source member. In other implementations, the control body may take another handheld shape, such as a small box shape.

In more specific implementations, one or both of the control body and the cartridge/aerosol source member may be referred to as being disposable or as being reusable. For example, the control body may have a power source such as a replaceable battery or a rechargeable battery, SSB, thin-film SSB, rechargeable supercapacitor, lithium-ion or hybrid lithium-ion supercapacitor, or the like. One example of a power source is a TKI-1550 rechargeable lithium-ion battery produced by Tadiran Batteries GmbH of Germany. In another implementation, a useful power source may be a N50-AAA CADNICA nickel-cadmium cell produced by Sanyo Electric Company, Ltd., of Japan. In other implementations, a plurality of such batteries, for example providing 1.2-volts each, may be connected in series. In some implementations, the power source is configured to provide an output voltage. The power source can power the aerosol production component that is powerable to produce an aerosol from an aerosol precursor composition. The power source may be connected with any type of recharging technology, such as a charging accessory. The security tag may also be connected with the power source or connected with any type of recharging technology in one embodiment.

Examples of power sources are described in U.S. Pat. No. 9,484,155 to Peckerar et al.; and U.S. Pat. App. Pub. No. 2017/0112191 to Sur et al., filed Oct. 21, 2015, the disclosures of which are incorporated herein by reference. Other examples of a suitable power source are provided in U.S. Pat. App. Pub. No. 2014/0283855 to Hawes et al., U.S. Pat. App. Pub. No. 2014/0014125 to Fernando et al., U.S. Pat. App. Pub. No. 2013/0243410 to Nichols et al., U.S. Pat. App. Pub. No. 2010/0313901 to Fernando et al., and U.S. Pat. No. 9,439,454 to Fernando et al., all of which are incorporated herein by reference. With respect to the flow sensor, representative current regulating components and other current controlling components including various microcontrollers, sensors, and switches for aerosol delivery devices are described in U.S. Pat. No. 4,735,217 to Gerth et al.; U.S. Pat. Nos. 4,922,901, 4,947,874, and 4,947,875, all to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; U.S. Pat. No. 8,205,622 to Pan; U.S. Pat. App. Pub. No. 8,881,737 to Collet et al.; U.S. Pat. No. 9,423,152 to Ampolini et al.; U.S. Pat. No. 9,439,454 to Fernando et al.; and U.S. Pat. App. Pub. No. 2015/0257445 to Henry et al., all of which are incorporated herein by reference.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference. Further, U.S. Pat. App. Pub. No. 2017/0099877 to Worm et al., discloses capsules that may be included in aerosol delivery devices and fob-shape configurations for aerosol delivery devices, and is incorporated herein by reference. A variety of the materials disclosed by the foregoing documents may be incorporated into the present devices in various implementations, and all of the foregoing disclosures are incorporated herein by reference.

Yet other features, controls or components that can be incorporated into aerosol delivery devices of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. App. Pub. No. 2005/0016550 to Katase; U.S. Pat. No. 8,689,804 to Fernando et al.; U.S. Pat. App. Pub. No. 2013/0192623 to Tucker et al.; U.S. Pat. No. 9,427,022 to Leven et al.; U.S. Pat. App. Pub. No. 2013/0180553 to Kim et al.; U.S. Pat. App. Pub. No. 2014/0000638 to Sebastian et al.; U.S. Pat. App. Pub. No. 2014/0261495 to Novak et al.; and U.S. Pat. No. 9,220,302 to DePiano et al., all of which are incorporated herein by reference.

In another aspect, the present disclosure may be directed to kits that provide a variety of components as described herein. For example, a kit may comprise a control body with one or more cartridges or aerosol source members. The kit may include the security tag for a particular component of the kit, such as a security tag with the control body. In alternative embodiments, the kit may have its own security tag, or there may be multiple components of the kit that include security tags. A kit may further include a charging accessory, along with one or more batteries, and a control body with one or more cartridges. A kit may further include the charging accessory and a control body with one or more cartridges, and/or with one or more batteries. A kit may further comprise a plurality of cartridges and one or more batteries and/or a charging accessory. In the above embodiments, the cartridges or the control bodies may be provided with a heating member inclusive thereto. The inventive kits may further include a case (or other packaging, carrying, or storage component) that accommodates one or more of the further kit components. The case could be a reusable hard or soft container, and/or may be simply a box or other packaging structure. Alternatively, the case may be or may include a security tag.

FIGS. 1 and 2 illustrate implementations of an aerosol delivery device including a control body and a cartridge in the case of an electronic cigarette. In this regard, FIGS. 1 and 2 illustrate an aerosol delivery device 100 according to an example implementation of the present disclosure. As indicated, the aerosol delivery device may include a control body 102 and a cartridge 104. The control body and the cartridge can be permanently or detachably aligned in a functioning relationship. In this regard, FIG. 1 illustrates a perspective view of the aerosol delivery device in a coupled configuration, whereas FIG. 2 illustrates a partially cut-away side view of the aerosol delivery device in a decoupled configuration. The aerosol delivery device may, for example, be substantially rod-like, substantially tubular shaped, or substantially cylindrically shaped in some implementations when the control body and the cartridge are in an assembled configuration.

The control body 102 and the cartridge 104 can be configured to engage one another by a variety of connections, such as a press fit (or interference fit) connection, a threaded connection, a magnetic connection, or the like. As such, the control body may include a first engaging element (e.g., a coupler) that is adapted to engage a second engaging element (e.g., a connector) on the cartridge. The first engaging element and the second engaging element may be reversible. As an example, either of the first engaging element or the second engaging element may be a male thread, and the other may be a female thread. As a further example, either the first engaging element or the second engaging element may be a magnet, and the other may be a metal or a matching magnet. In particular implementations, engaging elements may be defined directly by existing components of the control body and the cartridge. For example, the housing of the control body may define a cavity at an end thereof that is configured to receive at least a portion of the cartridge (e.g., a storage tank or other shell-forming element of the cartridge). In particular, a storage tank of the cartridge may be at least partially received within the cavity of the control body while a mouthpiece of the cartridge remains exposed outside of the cavity of the control body. The cartridge may be retained within the cavity formed by the control body housing, such as by an interference fit (e.g., through use of detents and/or other features creating an interference engagement between an outer surface of the cartridge and an interior surface of a wall forming the control body cavity), by a magnetic engagement (e.g., though use of magnets and/or magnetic metals positioned within the cavity of the control body and positioned on the cartridge), or by other suitable techniques.

As seen in the cut-away view illustrated in FIG. 2, the control body 102 and cartridge 104 each include a number of respective components. The components illustrated in FIG. 2 are representative of the components that may be present in a control body and cartridge and are not intended to limit the scope of components that are encompassed by the present disclosure. As shown, for example, the control body can be formed of a housing 206 (sometimes referred to as a control body shell) that can include a control component 208 (e.g., processing circuitry, etc.), a flow sensor 210, a power source 212 (e.g., battery, supercapacitor), and an indicator 214 (e.g., LED, quantum dot-based LED), and such components can be variably aligned. The power source may be rechargeable, and the control component may include a switch and processing circuitry coupled to the flow sensor and the switch.

The cartridge 104 can be formed of a housing 216 (sometimes referred to as the cartridge shell) enclosing a reservoir 218 configured to retain the aerosol precursor composition, and including a heating element 220 (aerosol production component). In various configurations, this structure may be referred to as a tank; and accordingly, the terms "cartridge," "tank" and the like may be used interchangeably to refer to a shell or other housing enclosing a reservoir for aerosol precursor composition, and including a heating element.

As shown, in some examples, the reservoir 218 may be in fluid communication with a liquid transport element 222 adapted to wick or otherwise transport an aerosol precursor composition stored in the reservoir housing to the heating element 220. In some examples, a valve may be positioned between the reservoir and heating element, and configured to control an amount of aerosol precursor composition passed or delivered from the reservoir to the heating element.

Various examples of materials configured to produce heat when electrical current is applied therethrough may be employed to form the heating element 220. The heating element in these examples may be a resistive heating element such as a wire coil, micro heater or the like. Example materials from which the heating element may be formed include Kanthal (FeCrAl), nichrome, nickel, stainless steel, indium tin oxide, tungsten, molybdenum disilicide (MoSi2), molybdenum silicide (MoSi), molybdenum disilicide doped with aluminum (Mo(Si,Al)2), titanium, platinum, silver, palladium, alloys of silver and palladium, graphite and graphite-based materials (e.g., carbon-based foams and yarns), conductive inks, boron doped silica, and ceramics (e.g., positive or negative temperature coefficient ceramics). The heating element may be resistive heating element or a heating element configured to generate heat through induction. The heating element may be coated by heat conductive ceramics such as aluminum nitride, silicon carbide, beryllium oxide, alumina, silicon nitride, or their composites. Example implementations of heating elements useful in aerosol delivery devices according to the present disclosure are further described below, and can be incorporated into devices such as those described herein.

An opening 224 may be present in the housing 216 (e.g., at the mouth end) to allow for egress of formed aerosol from the cartridge 104.

The cartridge 104 also may include one or more electronic components 226, which may include an integrated circuit, a memory component (e.g., EEPROM, flash memory), a sensor, or the like. The electronic components may be adapted to communicate with the control component 208 and/or with an external device by wired or wireless means. The electronic components may be positioned anywhere within the cartridge or a base 228 thereof.

Although the control component 208 and the flow sensor 210 are illustrated separately, it is understood that various electronic components including the control component and the flow sensor may be combined on a circuit board (e.g., PCB) that supports and electrically connects the electronic components. Further, the circuit board may be positioned horizontally relative the illustration of FIG. 1 in that the circuit board can be lengthwise parallel to the central axis of the control body. In some examples, the air flow sensor may comprise its own circuit board or other base element to which it can be attached. In some examples, a flexible circuit board may be utilized. A flexible circuit board may be configured into a variety of shapes, include substantially tubular shapes. In some examples, a flexible circuit board may be combined with, layered onto, or form part or all of a heater substrate.

The control body 102 and the cartridge 104 may include components adapted to facilitate a fluid engagement therebetween. As illustrated in FIG. 2, the control body can include a coupler 230 having a cavity 232 therein. The base 228 of the cartridge can be adapted to engage the coupler and can include a projection 234 adapted to fit within the cavity. Such engagement can facilitate a stable connection between the control body and the cartridge as well as establish an electrical connection between the power source 212 and control component 208 in the control body and the heating element 220 in the cartridge. Further, the housing 206 can include an air intake 236, which may be a notch in the housing where it connects to the coupler that allows for passage of ambient air around the coupler and into the housing where it then passes through the cavity 232 of the coupler and into the cartridge through the projection 234.

A coupler and a base useful according to the present disclosure are described in U.S. Pat. App. Pub. No. 2014/0261495 to Novak et al., which is incorporated herein by reference. For example, the coupler 230 as seen in FIG. 2 may define an outer periphery 238 configured to mate with an inner periphery 240 of the base 228. In one example the inner periphery of the base may define a radius that is substantially equal to, or slightly greater than, a radius of the outer periphery of the coupler. Further, the coupler may define one or more protrusions 242 at the outer periphery configured to engage one or more recesses 244 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The reservoir 218 illustrated in FIG. 2 can be a container or can be a fibrous reservoir, as presently described. For example, the reservoir can comprise one or more layers of nonwoven fibers substantially formed into the shape of a tube encircling the interior of the housing 216, in this example. An aerosol precursor composition can be retained in the reservoir. Liquid components, for example, can be sorptively retained by the reservoir. The reservoir can be in fluid connection with the liquid transport element 222. The liquid transport element can transport the aerosol precursor composition stored in the reservoir via capillary action—or via a micro pump—to the heating element 220 that is in the form of a metal wire coil in this example. As such, the heating element is in a heating arrangement with the liquid transport element.

In some examples, a microfluidic chip may be embedded in the reservoir 218, and the amount and/or mass of aerosol precursor composition delivered from the reservoir may be controlled by a micro pump, such as one based on microelectromechanical systems (MEMS) technology. Other example implementations of reservoirs and transport elements useful in aerosol delivery devices according to the present disclosure are further described herein, and such reservoirs and/or transport elements can be incorporated into devices such as those described herein. In particular, specific combinations of heating members and transport elements as further described herein may be incorporated into devices such as those described herein.

In use, when a user draws on the aerosol delivery device 100, airflow is detected by the flow sensor 210, and the heating element 220 is activated to vaporize components of the aerosol precursor composition. Drawing upon the mouth end of the aerosol delivery device causes ambient air to enter the air intake 236 and pass through the cavity 232 in the coupler 230 and the central opening in the projection 234 of the base 228. In the cartridge 104, the drawn air combines with the formed vapor to form an aerosol. The aerosol is whisked, aspirated or otherwise drawn away from the heating element and out the opening 224 in the mouth end of the aerosol delivery device.

For further detail regarding implementations of an aerosol delivery device including a control body and a cartridge in the case of an electronic cigarette, see the above-cited U.S. patent application Ser. No. 15/836,086 to Sur; and U.S. patent application Ser. No. 15/916,834 to Sur et al.; as well as U.S. patent application Ser. No. 15/916,696 to Sur, filed Mar. 9, 2018, which is also incorporated herein by reference.

FIGS. 3-6 illustrate implementations of an aerosol delivery device including a control body and an aerosol source member in the case of a heat-not-burn device. More specifically, FIG. 3 illustrates an aerosol delivery device 300 according to an example implementation of the present disclosure. The aerosol delivery device may include a control body 302 and an aerosol source member 304. In various implementations, the aerosol source member and the control body can be permanently or detachably aligned in a functioning relationship. In this regard, FIG. 3 illustrates the aerosol delivery device in a coupled configuration, whereas FIG. 4 illustrates the aerosol delivery device in a decoupled configuration.

As shown in FIG. 4, in various implementations of the present disclosure, the aerosol source member 304 may comprise a heated end 406, which is configured to be inserted into the control body 302, and a mouth end 408, upon which a user draws to create the aerosol. In various implementations, at least a portion of the heated end may include an aerosol precursor composition 410.

In various implementations, the aerosol source member 304, or a portion thereof, may be wrapped in an exterior overwrap material 412, which may be formed of any material useful for providing additional structure and/or support for the aerosol source member. In various implementations, the exterior overwrap material may comprise a material that resists transfer of heat, which may include a paper or other fibrous material, such as a cellulose material. The exterior overwrap material may also include at least one filler material imbedded or dispersed within the fibrous material. In various implementations, the filler material may have the form of water insoluble particles. Additionally, the filler material may incorporate inorganic components. In various implementations, the exterior overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto. The exterior overwrap may also include a material typically used in a filter element of a conventional cigarette, such as cellulose acetate.

Further, an excess length of the overwrap at the mouth end 408 of the aerosol source member may function to simply separate the aerosol precursor composition 410 from the mouth of a consumer or to provide space for positioning of a filter material, as described below, or to affect draw on the article or to affect flow characteristics of the vapor or aerosol leaving the device during draw. Further discussion relating to the configurations for overwrap materials that may be used with the present disclosure may be found in the above-cited U.S. Pat. No. 9,078,473 to Worm et al.

In various implementations other components may exist between the aerosol precursor composition 410 and the mouth end 408 of the aerosol source member 304, wherein the mouth end may include a filter 414, which may, for example, be made of a cellulose acetate or polypropylene material. The filter may additionally or alternatively contain strands of tobacco containing material, such as described in U.S. Pat. No. 5,025,814 to Raker et al., which is incorporated herein by reference in its entirety. In various implementations, the filter may increase the structural integrity of the mouth end of the aerosol source member, and/or provide filtering capacity, if desired, and/or provide resistance to draw. In some implementations one or any combination of the following may be positioned between the aerosol precursor composition and the mouth end: an air gap; phase change materials for cooling air; flavor releasing media; ion exchange fibers capable of selective chemical adsorption; aerogel particles as filter medium; and other suitable materials.

Various implementations of the present disclosure employ one or more conductive heating elements to heat the aerosol precursor composition 410 of the aerosol source member 304. In various implementations, the heating element may be provided in a variety forms, such as in the form of a foil, a foam, a mesh, a hollow ball, a half ball, discs, spirals, fibers, wires, films, yarns, strips, ribbons, or cylinders. Such heating elements often comprise a metal material and are configured to produce heat as a result of the electrical resistance associated with passing an electrical current therethrough. Such resistive heating elements may be positioned in direct contact with, or in proximity to, the aerosol source member and particularly, the aerosol precursor composition of the aerosol source member. The heating element may be located in the control body and/or the aerosol source member. In various implementations, the aerosol precursor composition may include components (i.e., heat conducting constituents) that are imbedded in, or otherwise part of, the substrate portion that may serve as, or facilitate the function of, the heating assembly. Some examples of various heating members and elements are described in U.S. Pat. No. 9,078,473 to Worm et al.

Some non-limiting examples of various heating element configurations include configurations in which a heating element is placed in proximity with the aerosol source member 304. For instance, in some examples, at least a portion of a heating element may surround at least a portion of an aerosol source member. In other examples, one or more heating elements may be positioned adjacent an exterior of an aerosol source member when inserted in the control body 302. In other examples, at least a portion of a heating element may penetrate at least a portion of an aerosol source member (such as, for example, one or more prongs and/or spikes that penetrate an aerosol source member), when the aerosol source member is inserted into the control body. In some instances, the aerosol precursor composition may include a structure in contact with, or a plurality of beads or particles imbedded in, or otherwise part of, the aerosol precursor composition that may serve as, or facilitate the function of the heating element.

FIG. 5 illustrates a front view of an aerosol delivery device 300 according to an example implementation of the present disclosure, and FIG. 6 illustrates a sectional view through the aerosol delivery device of FIG. 5. In particular, the control body 302 of the depicted implementation may comprise a housing 516 that includes an opening 518 defined in an engaging end thereof, a flow sensor 520 (e.g., a puff sensor or pressure switch), a control component 522 (e.g., processing circuitry, etc.), a power source 524 (e.g., battery, supercapacitor), and an end cap that includes an indicator 526 (e.g., a LED). The power source may be rechargeable, and the control component may include a switch and processing circuitry coupled to the flow sensor and the switch.

In one implementation, the indicator 526 may comprise one or more LEDs, quantum dot-based LEDs or the like. The indicator can be in communication with the control component 522 and be illuminated, for example, when a user draws on the aerosol source member 304, when coupled to the control body 302, as detected by the flow sensor 520.

The control body 302 of the depicted implementation includes one or more heating assemblies 528 (individually or collectively referred to a heating assembly) configured to heat the aerosol precursor composition 410 of the aerosol source member 304. Although the heating assembly of various implementations of the present disclosure may take a variety of forms, in the particular implementation depicted in FIGS. 5 and 6, the heating assembly comprises an outer cylinder 530 and a heating element 532 (aerosol production component), which in this implementation comprises a plurality of heater prongs that extend from a receiving base 534 (in various configurations, the heating assembly or more specifically the heater prongs may be referred to as a heater). In the depicted implementation, the outer cylinder comprises a double-walled vacuum tube constructed of stainless steel to maintain heat generated by the heater prongs within the outer cylinder, and more particularly, maintain heat generated by heater prongs within the aerosol precursor composition. In various implementations, the heater prongs may be constructed of one or more conductive materials, including, but not limited to, copper, aluminum, platinum, gold, silver, iron, steel, brass, bronze, graphite, or any combination thereof.

As illustrated, the heating assembly 528 may extend proximate an engagement end of the housing 516, and may be configured to substantially surround a portion of the heated end 406 of the aerosol source member 304 that includes the aerosol precursor composition 410. In such a manner, the heating assembly may define a generally tubular configuration. As illustrated in FIGS. 5 and 6, the heating element 532 (e.g., plurality of heater prongs) is surrounded by the outer cylinder 530 to create a receiving chamber 536. In such a manner, in various implementations the outer cylinder may comprise a nonconductive insulating material and/or construction including, but not limited to, an insulating polymer (e.g., plastic or cellulose), glass, rubber, ceramic, porcelain, a double-walled vacuum structure, or any combinations thereof.

In some implementations, one or more portions or components of the heating assembly 528 may be combined with, packaged with, and/or integral with (e.g., embedded within) the aerosol precursor composition 410. For example, in some implementations the aerosol precursor composition may be formed of a material as described above and may include one or more conductive materials mixed therein. In some of these implementations, contacts may be connected directly to the aerosol precursor composition such that, when the aerosol source member is inserted into the receiving chamber of the control body, the contacts make electrical connection with the electrical energy source. Alternatively, the contacts may be integral with the electrical energy source and may extend into the receiving chamber such that, when the aerosol source member is inserted into the receiving chamber of the control body, the contacts make electrical connection with the aerosol precursor composition. Because of the presence of the conductive material in the aerosol precursor composition, the application of power from the electrical energy source to the aerosol precursor composition allows electrical current to flow and thus produce heat from the conductive material. Thus, in some implementations the heating element may be described as being integral with the aerosol precursor composition. As a non-limiting example, graphite or other suitable, conductive material may be mixed with, embedded in, or otherwise present directly on or within the material forming the aerosol precursor composition to make the heating element integral with the medium.

As noted above, in the illustrated implementation, the outer cylinder 530 may also serve to facilitate proper positioning of the aerosol source member 304 when the aerosol source member is inserted into the housing 516. In various implementations, the outer cylinder of the heating assembly 528 may engage an internal surface of the housing to provide for alignment of the heating assembly with respect to the housing. Thereby, as a result of the fixed coupling between the heating assembly, a longitudinal axis of the heating assembly may extend substantially parallel to a longitudinal axis of the housing. In particular, the support cylinder may extend from the opening 518 of the housing to the receiving base 534 to create the receiving chamber 536.

The heated end 406 of the aerosol source member 304 is sized and shaped for insertion into the control body 302. In various implementations, the receiving chamber 536 of the control body may be characterized as being defined by a wall with an inner surface and an outer surface, the inner surface defining the interior volume of the receiving chamber. For example, in the depicted implementations, the outer cylinder 530 defines an inner surface defining the interior volume of the receiving chamber. In the illustrated implementation, an inner diameter of the outer cylinder may be slightly larger than or approximately equal to an outer diameter of a corresponding aerosol source member (e.g., to create a sliding fit) such that the outer cylinder is configured to guide the aerosol source member into the proper position (e.g., lateral position) with respect to the control body. Thus, the largest outer diameter (or other dimension depending upon the specific cross-sectional shape of the implementations) of the aerosol source member may be sized to be less than the inner diameter (or other dimension) at the inner surface of the wall of the open end of the receiving chamber in the control body. In some implementations, the difference in the respective diameters may be sufficiently small so that the aerosol source member fits snugly into the receiving chamber, and frictional forces prevent the aerosol source member from being moved without an applied force. On the other hand, the difference may be sufficient to allow the aerosol source member to slide into or out of the receiving chamber without requiring undue force.

In the illustrated implementation, the control body 302 is configured such that when the aerosol source member 304 is inserted into the control body, the heating element 532 (e.g., heater prongs) is located in the approximate radial center of at least a portion of the aerosol precursor composition 410 of the heated end 406 of the aerosol source member. In such a manner, when used in conjunction with a solid or semi-solid aerosol precursor composition, the heater prongs may be in direct contact with the aerosol precursor composition. In other implementations, such as when used in conjunction with an extruded aerosol precursor composition that defines a tube structure, the heater prongs may be located inside of a cavity defined by an inner surface of the extruded tube structure, and would not contact the inner surface of the extruded tube structure.

During use, the consumer initiates heating of the heating assembly 528, and in particular, the heating element 532 that is adjacent the aerosol precursor composition 410 (or a specific layer thereof). Heating of the aerosol precursor composition releases the inhalable substance within the aerosol source member 304 so as to yield the inhalable substance. When the consumer inhales on the mouth end 408 of the aerosol source member, air is drawn into the aerosol source member through an air intake 538 such as openings or apertures in the control body 302. The combination of the drawn air and the released inhalable substance is inhaled by the consumer as the drawn materials exit the mouth end of the aerosol source member. In some implementations, to initiate heating, the consumer may manually actuate a push-button or similar component that causes the heating element of the heating assembly to receive electrical energy from the battery or other energy source. The electrical energy may be supplied for a pre-determined length of time or may be manually controlled.

In some implementations, flow of electrical energy does not substantially proceed in between puffs on the device 300 (although energy flow may proceed to maintain a baseline temperature greater than ambient temperature—e.g., a temperature that facilitates rapid heating to the active heating temperature). In the depicted implementation, however, heating is initiated by the puffing action of the consumer through use of one or more sensors, such as flow sensor 520. Once the puff is discontinued, heating will stop or be reduced. When the consumer has taken a sufficient number of puffs so as to have released a sufficient amount of the inhalable substance (e.g., an amount sufficient to equate to a typical smoking experience), the aerosol source member 304 may be removed from the control body 302 and discarded. In some implementations, further sensing elements, such as capacitive sensing elements and other sensors, may be used as discussed in U.S. patent application Ser. No. 15/707,461 to Phillips et al., which is incorporated herein by reference.

In various implementations, the aerosol source member 304 may be formed of any material suitable for forming and maintaining an appropriate conformation, such as a tubular shape, and for retaining therein the aerosol precursor composition 410. In some implementations, the aerosol source member may be formed of a single wall or, in other implementations, multiple walls, and may be formed of a material (natural or synthetic) that is heat resistant so as to retain its structural integrity—e.g., does not degrade—at least at a temperature that is the heating temperature provided by the electrical heating element, as further discussed herein. While in some implementations, a heat resistant polymer may be used, in other implementations, the aerosol source member may be formed from paper, such as a paper that is substantially straw-shaped. As further discussed herein, the aerosol source member may have one or more layers associated therewith that function to substantially prevent movement of vapor therethrough. In one example implementation, an aluminum foil layer may be laminated to one surface of the aerosol source member. Ceramic materials also may be used. In further implementations, an insulating material may be used so as not to unnecessarily move heat away from the aerosol precursor composition. Further example types of components and materials that may be used to provide the functions described above or be used as alternatives to the materials and components noted above can be those of the types set forth in U.S. Pat. App. Pub. Nos. 2010/00186757 to Crooks et al., 2010/00186757 to Crooks et al., and 2011/0041861 to Sebastian et al., all of which are incorporated herein by reference.

In the depicted implementation, the control body 302 includes a control component 522 that controls the various functions of the aerosol delivery device 300, including providing power to the electrical heating element 532. For example, the control component may include processing circuitry (which may be connected to further components, as further described herein) that is connected by electrically conductive wires (not shown) to the power source 524. In various implementations, the processing circuitry may control when and how the heating assembly 528, and particularly the heater prongs, receives electrical energy to heat the aerosol precursor composition 410 for release of the inhalable substance for inhalation by a consumer. In some implementations, such control may be activated by a flow sensor 520 as described in greater detail above.

As seen in FIGS. 5 and 6, the heating assembly 528 of the depicted implementation comprises an outer cylinder 530 and a heating element 532 (e.g., plurality of heater prongs) that extend from a receiving base 534. In some implementations, such as those wherein the aerosol precursor composition 410 comprises a tube structure, the heater prongs may be configured to extend into a cavity defined by the inner surface of the aerosol precursor composition. In other implementations, such as the depicted implementation wherein the aerosol precursor composition comprises a solid or semi-solid, the plurality of heater prongs are configured to penetrate into the aerosol precursor composition contained in the heated end 406 of the aerosol source member 304 when the aerosol source member is inserted into the control body 302. In such implementations, one or more of the components of the heating assembly, including the heater prongs and/or the receiving base, may be constructed of a non-stick or stick-resistant material, for example, certain aluminum, copper, stainless steel, carbon steel, and ceramic materials. In other implementations, one or more of the components of the heating assembly, including the heater prongs and/or the receiving base, may include a non-stick coating, including, for example, a polytetrafluoroethylene (PTFE) coating, such as Teflon®, or other coatings, such as a stick-resistant enamel coating, or a ceramic coating, such as Greblon®, or Thermolon™, or a ceramic coating, such as Greblon®, or Thermolon™.

In addition, although in the depicted implementation there are multiple heater prongs 532 that are substantially equally distributed about the receiving base 534, it should be noted that in other implementations, any number of heater prongs may be used, including as few as one, with any other suitable spatial configuration. Furthermore, in various implementations the length of the heater prongs may vary. For example, in some implementations the heater prongs may comprise small projections, while in other implementations the heater prongs may extend any portion of the length of the receiving chamber 536, including up to about 25%, up to about 50%, up to about 75%, and up to about the full length of the receiving chamber. In still other implementations, the heating assembly 528 may take on other configurations. Examples of other heater configurations that may be adapted for use in the present invention per the discussion provided above can be found in U.S. Pat. No. 5,060,671 to Counts et al., U.S. Pat. No. 5,093,894 to Deevi et al., U.S. Pat. No. 5,224,498 to Deevi et al., U.S. Pat. No. 5,228,460 to Sprinkel Jr., et al., U.S. Pat. No. 5,322,075 to Deevi et al., U.S. Pat. No. 5,353,813 to Deevi et al., U.S. Pat. No. 5,468,936 to Deevi et al., U.S. Pat. No. 5,498,850 to Das, U.S. Pat. No. 5,659,656 to Das, U.S. Pat. No. 5,498,855 to Deevi et al., U.S. Pat. No. 5,530,225 to Hajaligol, U.S. Pat. No. 5,665,262 to Hajaligol, and U.S. Pat. No. 5,573,692 to Das et al.; and U.S. Pat. No. 5,591,368 to Fleischhauer et al., which are incorporated herein by reference.

In various implementations, the control body 302 may include an air intake 538 (e.g., one or more openings or apertures) therein for allowing entrance of ambient air into the interior of the receiving chamber 536. In such a manner, in some implementations the receiving base 534 may also include an air intake. Thus, in some implementations when a consumer draws on the mouth end of the aerosol source member 304, air can be drawn through the air intake of the control body and the receiving base into the receiving chamber, pass into the aerosol source member, and be drawn through the aerosol precursor composition 410 of the aerosol source member for inhalation by the consumer. In some implementations, the drawn air carries the inhalable substance through the optional filter 414 and out of an opening at the mouth end 408 of the aerosol source member. With the heating element 532 positioned inside the aerosol precursor composition, the heater prongs may be activated to heat the aerosol precursor composition and cause release of the inhalable substance through the aerosol source member.

As described above with reference to FIGS. 5 and 6 in particular, various implementations of the present disclosure employ a conductive heater to heat the aerosol precursor composition 410. As also indicated above, various other implementations employ an induction heater to heat the aerosol precursor composition. In some of these implementations, the heating assembly 528 may be configured as an induction heater that comprises a transformer with an induction transmitter and an induction receiver. In implementations in which the heating assembly is configured as the induction heater, the outer cylinder 530 may be configured as the induction transmitter, and the heating element 532 (e.g., plurality of heater prongs) that extend from the receiving base 534 may be configured as the induction receiver. In various implementations, one or both of the induction transmitter and induction receiver may be located in the control body 302 and/or the aerosol source member 304.

In various implementations, the outer cylinder 530 and heating element 532 as the induction transmitter and induction receiver may be constructed of one or more conductive materials, and in further implementations the induction receiver may be constructed of a ferromagnetic material including, but not limited to, cobalt, iron, nickel, and combinations thereof. In one example implementation, the foil material is constructed of a conductive material and the heater prongs are constructed of a ferromagnetic material. In various implementations, the receiving base may be constructed of a non-conductive and/or insulating material.

The outer cylinder 530 as the induction transmitter may include a laminate with a foil material that surrounds a support cylinder. In some implementations, the foil material may include an electrical trace printed thereon, such as, for example, one or more electrical traces that may, in some implementations, form a helical coil pattern when the foil material is positioned around the heating element 532 as the induction receiver. The foil material and support cylinder may each define a tubular configuration. The support cylinder may be configured to support the foil material such that the foil material does not move into contact with, and thereby short-circuit with, the heater prongs. In such a manner, the support cylinder may comprise a nonconductive material, which may be substantially transparent to an oscillating magnetic field produced by the foil material. In various implementations, the foil material may be imbedded in, or otherwise coupled to, the support cylinder. In the illustrated implementation, the foil material is engaged with an outer surface of the support cylinder; however, in other implementations, the foil material may be positioned at an inner surface of the support cylinder or be fully imbedded in the support cylinder.

The foil material of the outer cylinder 530 may be configured to create an oscillating magnetic field (e.g., a magnetic field that varies periodically with time) when alternating current is directed through it. The heater prongs of the heating element 532 may be at least partially located or received within the outer cylinder and include a conductive material. By directing alternating current through the foil material, eddy currents may be generated in the heater prongs via induction. The eddy currents flowing through the resistance of the material defining the heater prongs may heat it by Joule heating (i.e., through the Joule effect). The heater prongs may be wirelessly heated to form an aerosol from the aerosol precursor composition 410 positioned in proximity to the heater prongs.

Other implementations of the aerosol delivery device, control body and aerosol source member are described in the above-cited U.S. patent application Ser. No. 15/916,834 to Sur et al.; U.S. patent application Ser. No. 15/916,696 to Sur; and U.S. patent application Ser. No. 15/836,086 to Sur.

FIGS. 7 and 8 illustrate implementations of an aerosol delivery device including a control body and a cartridge in the case of a no-heat-no-burn device. In this regard, FIG. 7 illustrates a side view of an aerosol delivery device 700 including a control body 702 and a cartridge 704, according to various example implementations of the present disclosure. In particular, FIG. 7 illustrates the control body and the cartridge coupled to one another. The control body and the cartridge may be detachably aligned in a functioning relationship.

FIG. 8 more particularly illustrates the aerosol delivery device 700, in accordance with some example implementations. As seen in the cut-away view illustrated therein, again, the aerosol delivery device can comprise a control body 702 and a cartridge 704 each of which include a number of respective components. The components illustrated in FIG. 8 are representative of the components that may be present in a control body and cartridge and are not intended to limit the scope of components that are encompassed by the present disclosure. As shown, for example, the control body can be formed of a control body housing or shell 806 that can include a control component 808 (e.g., processing circuitry, etc.), an input device 810, a power source 812 and an indicator 814 (e.g., LED, quantum dot-based LED), and such components can be variably aligned. Here, a particular example of a suitable control component includes the PIC16 (L)F1713/6 microcontrollers from Microchip Technology Inc., which is described in Microchip Technology, Inc., AN2265, Vibrating Mesh Nebulizer Reference Design (2016), which is incorporated by reference.

The cartridge 704 can be formed of a housing—referred to at times as a cartridge shell 816—enclosing a reservoir 818 configured to retain the aerosol precursor composition, and including a nozzle 820 having a piezoelectric/piezomagnetic mesh (aerosol production component). Similar to above, in various configurations, this structure may be referred to as a tank.

The reservoir 818 illustrated in FIG. 8 can be a container or can be a fibrous reservoir, as presently described. The reservoir may be in fluid communication with the nozzle 820 for transport of an aerosol precursor composition stored in the reservoir housing to the nozzle. An opening 822 may be present in the cartridge shell 816 (e.g., at the mouthend) to allow for egress of formed aerosol from the cartridge 704.

In some examples, a transport element may be positioned between the reservoir 818 and nozzle 820, and configured to control an amount of aerosol precursor composition passed or delivered from the reservoir to the nozzle. In some examples, a microfluidic chip may be embedded in the cartridge 704, and the amount and/or mass of aerosol precursor composition delivered from the reservoir may be controlled by one or more microfluidic components. One example of a microfluidic component is a micro pump 824, such as one based on microelectromechanical systems (MEMS) technology. Examples of suitable micro pumps include the model MDP2205 micro pump and others from thinXXS Microtechnology AG, the mp5 and mp6 model micro pumps and others from Bartels Mikrotechnik GmbH, and piezoelectric micro pumps from Takasago Fluidic Systems.

As also shown, in some examples, a micro filter 826 may be positioned between the micro pump 824 and nozzle 820 to filter aerosol precursor composition delivered to the nozzle. Like the micro pump, the micro filter is a microfluidic component. Examples of suitable micro filters include flow-through micro filters those manufactured using lab-on-a-chip (LOC) techniques.

In use, when the input device 810 detects user input to activate the aerosol delivery device, the piezoelectric/piezomagnetic mesh is activated to vibrate and thereby draw aerosol precursor composition through the mesh. This forms droplets of aerosol precursor composition that combine with air to form an aerosol. The aerosol is whisked, aspirated or otherwise drawn away from the mesh and out the opening 822 in the mouthend of the aerosol delivery device.

The aerosol delivery device 700 can incorporate the input device 810 such as a switch, sensor or detector for control of supply of electric power to the piezoelectric/piezomagnetic mesh of the nozzle 820 when aerosol generation is desired (e.g., upon draw during use). As such, for example, there is provided a manner or method of turning off power to the mesh when the aerosol delivery device is not being drawn upon during use, and for turning on power to actuate or trigger the production and dispensing of aerosol from the nozzle during draw. Additional representative types of sensing or detection mechanisms, structure and configuration thereof, components thereof, and general methods of operation thereof, are described above and in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference.

For more information regarding the above and other implementations of an aerosol delivery device in the case of a no-heat-no-burn device, see U.S. patent application Ser. No. 15/651,548 to Sur., filed Jul. 17, 2017, which is incorporated herein by reference.

As described above, the aerosol delivery device of example implementations may include various electronic components in the context of an electronic cigarette, heat-not-burn device or no-heat-no-burn device, or even in the case of a device that includes the functionality of one or more of an electronic cigarette, heat-not-burn device or no-heat-no-burn device. FIG. 9 illustrates a circuit diagram of an aerosol delivery device 900 that may be or incorporate functionality of any one or more of aerosol delivery devices 100, 300, 700 according to various example implementations of the present disclosure.

As shown in FIG. 9, the aerosol delivery device 900 includes a control body 902 with a power source 904 and a control component 906 that may correspond to or include functionality of respective ones of the control body 102, 302, 702, power source 212, 524, 812, and control component 208, 522, 808. The aerosol delivery device also includes an aerosol production component 916 that may correspond to or include functionality of heating element 220, 532, or piezoelectric/piezomagnetic mesh of nozzle 820. The control body 902 may include the aerosol production component 916 or terminals 918 configured to connect the aerosol production component to the control body.

In some implementations, the control body 902 includes a sensor 908 configured to produce measurements of air flow. The sensor 908 may correspond to or include functionality of the flow sensor 210, 520 or input device 810. In these implementations, the control component 906 includes a switch 910 coupled to and between the power source 904 and the aerosol production component 916. The control component also includes processing circuitry 912 coupled to the sensor and the switch. The switch can be a Metal Oxide Semiconductor Field Effect Transistor (MOSFET) switch. The sensor may be connected to inter-integrated circuit (I2C), Vcc and/or ground of the processing circuitry. The processing circuitry 912 is configured to verify the age of a user, and to output a signal (as indicated by arrow 922) to cause the switch 910 to switchably connect and disconnect an output voltage from the power source 904 to the aerosol production component 916 to power the aerosol production component for an aerosol-production time period. In some implementations, the processing circuitry is configured to output a pulse width modulation (PWM) signal. A duty cycle of the PWM signal is adjustable to cause the switch to switchably connect and disconnect the output voltage to the aerosol production component.

The aerosol production component 916 may be controlled in a number of different manners, including via the power provided to the aerosol production component during the aerosol-production time period. In some implementations, at a periodic rate during the aerosol-production time period, the processing circuitry 912 is configured to determine a sample window of measurements of instantaneous actual power provided to the aerosol production component. Each measurement of the sample window of measurements may be determined as a product of a voltage at and a current through the aerosol production component. The processing circuitry of such implementations may be further configured to calculate a moving average power provided to the aerosol production component based on the sample window of measurements of instantaneous actual power. In such implementations, the processing circuitry may be further configured to compare the moving average power to a power set point, and output the signal to cause the switch to respectively disconnect and connect the output voltage at each instance in which the moving average power is respectively above or below the power set point. In one example, the processing circuitry 912 can determine the actual voltage and current (I) through the aerosol production component 916. The processing circuitry can read the determined voltage and current values from analog to digital converter (ADC) inputs of the processing circuitry and determine an instantaneous "actual" power (I*V) directed to the aerosol production component. In some instances, such an "instantaneous" power measurement may be added to a sample window or moving window of values (i.e., other instantaneous power measurements) and then a moving average power of the sample window may be calculated, for example, according to the equation, $P_{avg}=P_{sample}+P_{avg}^{1}/$ Window Size. In some aspects, for example, the window size may be between about 20 and about 256 samples.

In some examples, the processing circuitry 912 may then compare the calculated moving average power to a power set point. The power set point can be a selected power set point associated with the power source 904 (e.g., a power level or current output from the power source regulated by the processing circuitry 912, or other regulating component associated therewith and disposed in electrical communication between the power source and the aerosol production component 916).

In some examples, (1) if $P_{ave}$ (the actual power determined at the aerosol production component 916) is below the selected power set point (the average power), the switch 910 is turned on so as to allow current flow from the power source 904 to the aerosol production component; (2) if $P_{ave}$ is above the selected power set point, the switch is turned off so as to prevent current flow from the power source to the aerosol production component; and (3) steps 1 and 2 are repeated until expiration or cessation of the aerosol-production time period. More particularly, during the aerosol-production time period, the determination and calculation of the actual power at the aerosol production component, the comparison of the actual power to the pre-selected power set point, and ON/OFF decisions for the switch to adjust the pre-selected power set point may be substantially continuously performed by the processing circuitry 912 at a periodic rate, for example, of between about 20 and 50 times per second, so as to ensure a more stable and accurate average power directed to and delivered at the aerosol production component. Various examples of controlling the switch based on the actual power determined at the aerosol production component (Pave) are described in U.S. Pat. No. 9,423,152 to Ampolini et al., which is incorporated herein by reference.

In some implementations, the control component 906 further includes signal conditioning circuitry 914 coupled to the sensor 908 and the processing circuitry 912. The signal conditioning circuitry of such implementations may be configured to manipulate the operation of the switch 910. The signal conditioning circuitry will be described in greater detail below with reference to FIG. 10.

FIG. 10 illustrates a circuit diagram of signal conditioning circuitry 1000 that may correspond to signal conditioning circuitry 914, according to an example implementation of the present disclosure. As shown, in some implementations, the signal conditioning circuitry 1000 includes a signal conditioning chip 1001, and a bidirectional voltage-level translator 1002. One example of a suitable signal conditioning chip is the model ZAP 3456 from Zap-Tech corporation. And one example of a suitable bidirectional voltage-level translator is the model NVT 2003 bidirectional voltage-level translator from NXP Semiconductors.

In one example, as shown in FIG. 10, the signal conditioning chip 1001 can be connected to the bidirectional voltage-level translator 1002, and the bidirectional voltage-level translator can be connected to the 5V input and ground of the processing circuitry 912. Note that the values (e.g., voltage, resistances and capacitance) shown in FIG. 10 are for purposes of illustrating the example only, and unless stated otherwise, the values should not be taken as limiting in the present disclosure.

FIG. 11 is an example security tag 1104 on a device 1102. The device 1102 may be any electronic nicotine delivery systems ("ENDS") device including an aerosol delivery device as described above. In alternative embodiments, the security tag 1104 may be applied to devices other than ENDS devices. Shown in FIG. 11, the security tag 1104 is attached to a control body of the device 1102 (such as control body 102). The security tag 1104 may prevent the control body 102 from connecting with the cartridge 104 without modifying the device or the control body. In other words, the security tag 1104 prevents a cartridge from being coupled with the device 1102. The device 1102 cannot operate without connection to a cartridge. The security tag 1104 can be considered a lock on the device 1102 that requires unlocking (by authentication) for usage of the device 1102.

In an alternative embodiment, the security tag 1104 could be applied to an opposite end of the device 1102 in order to prevent charging of the device 1102. The opposite end may include a port or other contact point for connecting a cord or pins for contacting with a power source for powering the device 1102. The security tag 1104 on this end of the device prevents operation by preventing the device from being charged. It will be appreciated that in embodiments at which a charging contact point is located at a position other than a distal end of the device that the security tag 1104 may be disposed at such other position. For example, for a wireless contact point on a side of the device, the security tag may be disposed at the wireless contact point to prevent operation unless properly removed.

FIG. 12 is another example security tag 1204 on a device 1202. The example security tag 1104 in FIG. 11 can be disposed on one end to the device 1102, whereas the security tag 1204 in FIG. 12 is disposed over the entire device 1202. The security tag 1204 may cover or disable both a cartridge end 1204a and/or a charging end 1204b of the device 1202. The cartridge end 1204a may couple with a cartridge, which is prevented by the security tag 1204, while the charging end 1204b may coupled with a power source, which is prevented by the security tag 1204. As with the embodiment in FIG. 11, operation of the device 1202 is prevented by the security tag 1204 and improper attempts to remove the security tag 1204 will damage the device 1202 and render it inoperable. Upon authentication (e.g. age verification), the security tag 1204 can be removed without damaging the device 1202 or rendering it inoperable. As with FIG. 11, the security tag 1204 can be applied to the device 1202 without changing or altering any aspect of the device 1202. Specifically, the actual charging or operation is unchanged by attaching and removing the security tag 1204 even though the charging and/or operation may be temporarily prevented by the presence of the security tag 1204.

The security tag 1104/1204 can be removed upon proper authentication, such as age verification discussed below with respect to FIGS. 19-21. After proper removal, the device 1102/1202 operates as if the security tag 1104/1204 was not applied. Not only can the security tag 1104/1204 prevent operation of the device 1102/1202, but attempts to improperly remove the security tag 1104/1204 (e.g. without proper authentication) can render the device 1102/1202 inoperable. In other words, improperly removing the security tag 1104/1204 can disable the device 1102/1202 as described below with respect to FIG. 14. The proper authentication that can unlock the security tag 1104/1204 can be through communications described below with respect to FIG. 13.

The security tag 1104/1204 could be applied to a cartridge (e.g. cartridge 104) rather than or in addition to the device 1102/1202. The security tag 1104/1204 could prevent cartridges from being used unless they are properly authenticated. This could provide additional security or may be unnecessary if the device 1102/1202 (e.g. control body 102) already has a security tag.

FIG. 13 illustrates communication examples 1301. In order to unlock or authenticate the security tag, there is some form of communication to the security tag to initiate the unlocking. There are many different ways that the security tag can be unlocked and FIG. 13 is provided by way of example illustration of some examples of communication mechanisms for unlocking the security tag. The process for authentication may include a process for communicating over a network. For example, the age verification process described below may include an online confirmation of age based on information provided by the user. In response to the online authentication, the user will have a communication for the security tag to properly remove the security tag without disabling the device.

Each security tag may include a unique serial number that may act as a code for being unlocked. The unique serial number can also be used as an input or output of a mathematical function, hash, or encoding of the serial number that is used for unlocking the security tag. The serial numbers on the security tag may be unique. The serial numbers may include any combination of one or more character types that may be used to generate a set of unique serial numbers, including, for example, numbers, letters, characters, some combination thereof (e.g., alphanumeric strings), or the like. There may also be serial numbers on the cartridges or consumables. Those serial numbers may be registered as described in U.S. patent application Ser. No. 16/415,444, entitled "AGE VERIFICATION WITH REGISTERED CARTRIDGES FOR AN AEROSOL DELIVERY DEVICE," filed May 17, 2019, which is hereby incorporated by reference.

Some forms of communication with the security tag may require a power source for the security tag to communicate. In one embodiment, the charging cable or charging mechanism for the device can also couple with the security tag for providing enough power for the communication.

One communication example 1301 includes Bluetooth 1302 communication with the security tag. The security tag may include capability for Bluetooth communication (e.g. Bluetooth transceiver) with a computing device, such as a smartphone.

Another communication example 1301 includes bar codes 1304. The bar codes 1304 may be a scannable tag/code. In one embodiment, the security tag 1304 may include scanning functionality for scanning a bar code. Example bar codes may include any type of scannable identifier, such as a universal product code (UPC), data matrix code, and/or a quick response (QR) code. The code may include any one-dimensional (1D) codes, two-dimensional (2D) codes, three-dimensional (3D) codes, or other types of codes. The user may complete the authentication process and receive a bar code on their computing device (e.g. smartphone) and the security tag scans the barcode. For purposes of this example, the scannable tag/code may be a QR code and the user may have an application or app on a mobile phone that receives the scanned QR code or the serial number of the security tag.

Another communication example 1301 includes radio frequency identification (RFID) 1306. The security tag may communicate through RFID. For example, the security tag may receive an unlock command through RFID. Example communications and authentication with RFID are described in U.S. Pat. No. 10,015,987 to Henry et al., and U.S. Pat. Pub. No. 2017/0020191 to Lamb et al., each of which is hereby incorporated by reference.

Another communication example 1301 includes near field communication (NFC) 1308. The security tag may communicate through NFC. For example, the security tag may receive an unlock command through NFC. Exemplary communications and authentication with NFC is described in U.S. Pat. No. 9,864,947 to Sur et al., which is hereby incorporated by reference.

Another communication example 1301 includes an audio signal 1310. FIG. 15 illustrates embodiments 1502 of how the audio signal 1310 can be communicated with an audio detector. The audio signal 1310 may be detected by the security tag with a pressure sensor 1507 and/or a microphone 1508. Examples of audio detectors 1502 are further described in U.S. patent application Ser. No. 16/441,903, entitled "Functional Control and Age Verification of Electronic Devices through Speaker Communication," filed on Jun. 14, 2019, which is herein incorporated by reference. In some embodiments in which the device is a puff activated aerosol delivery device, the pressure sensor 1507 may include the existing pressure sensor in the device (e.g. sensor 908) that may be used to measure changes in pressure, such as when a user puffs or inhales on the device that activates the device (e.g. turns on the heater). There may be a separate pressure sensor that measures inhalation for activating the device, or there may just be one pressure sensor that activates the device on inhalation and is used for detecting the audio signal. The security tag may have its own sensor or may utilize the sensor from the device.

The audio signal 1310 may be referred to as an authentication tone and may be a low frequency pressure wave. In one embodiment, the wave may be on the lower end of functionality for a basic phone speaker that is used in most smartphones or cell phones. In one example, the frequency could be around 10 Hz-20 Hz in order for the pressure sensor 1507 to detect the tone with a reduced signal-to-noise ratio. There may be many different embodiments of the pressure sensor 1507 that could detect the audio signal 1310. One example is a sealed differential pressure sensor that allows changes in the ambient pressure (due to pressure or sound waves) to be compared with a standard reference pressure.

A sealed differential pressure sensor could detect sound waves emitted from a speaker. Alternatively, the pressure sensor 1507 may be an unsealed differential pressure sensor which includes a flow sensor that compares the pressure produced from a fluid stream passing by two apertures of different diameters. An unsealed differential pressure sensor may need to be arranged to better detect sound waves.

In another embodiment, the audio signal 1310 may be detected by a microphone 1508. The microphone 1508 may be able to sense a wider range of tones (e.g. non-audible in addition to audible) tones that could be emitted by the cell phone speaker, but it would be an additional component. Specifically, audible tones may be the frequency range that is audible to humans, while the tones could further include a wider range, including non-audible tones. The microphone 1508 could be used to sense puffs and activate the heater, or there may be a secondary microphone for detecting the audio signal 1310 or authentication tone only. In this embodiment, the frequency may be on the upper end of the functionality of a smartphone, cell phone, tablet, or other common speakers, such as in the 20 kHz to 25 kHz range. Such a frequency would be inaudible to the user or device purchaser while still being sensed by the microphone 1508. The microphone 1508 could sense tones based on the limit of its functionality, including any audible frequencies in a range between approximately 20 Hz to 20 kHz. There may be many different embodiments of the microphone 1508 that could detect the audio signal 1310. One example is a MEMS electret microphone which uses a PTFE-based film diaphragm. This example may be an appropriate size with longevity. In other examples, other electret microphones could be used. In addition, there are other microphones in the condenser microphone family. Other examples include a crystal or piezo microphone. These examples may sense noise or vibrations through solid objects and could be placed internally against the outer shell of the device, which may eliminate the need for an orifice, canal, or port to allow sound waves to travel into the device.

Referring back to FIG. 13, another communication example 1301 includes an optical signal 1312. FIG. 16 illustrates embodiments of how an optical/visual signal 1312 can be communicated with an optical detector. The optical signal 1312 may also be referred to as a visual signal or a light signal. Examples of visual/optical detectors 1602 are further described in U.S. patent application Ser. No. 16/441,937, entitled "Functional Control and Age Verification of Electronic Devices through Visual Communication," filed on Jun. 14, 2019, which is herein incorporated by reference.

The security tag may include functionality for receiving the optical signal 1312, which can unlock the device upon authentication/verification. FIG. 16 shows example detectors for the optical signal 1312 and include a light sensor 1607, a photodiode 1608, a reader 1609, and/or an infrared detector 1610. The light sensor 1607 may include any light dependent resistive elements. These sensors may change in resistance due to the presence or absence of light. This may require current to flow through the resistive element when the optical signal 1312 (i.e. authentication light sequence) is being transmitted. The photodiode 1608 may include sensors that generate a small current when exposed to a light source. It may act as a switch and may have a quick response time.

A reader 1609, such as a camera, barcode reader, or other detector may be used for the optical signal 1312. In one example, the user may capture a picture of a unique serial number or code (e.g. bar code) associated with the particular security tag. In alternative examples, the reader 1609 may be a magnetic strip reader, a chip reader (e.g. similar to a credit card reader), wired communication, or wireless communication.

The optical signal 1312 may include an infrared (IR) signal detected by an IR sensor 1610 in one embodiment. In some embodiments, there may be a combination of the visible light spectrum and IR, which may rely on different optical detectors (e.g. light sensor 1607 and IR 1610) or a single sensor may measure both. Having a combination of optical types may provide for a larger set of code combinations for the optical signal 1312. The user may be able to see the visible light spectrum, while the IR may not be detectable which could also improve security by preventing recreation of the optical signal. For an IR or non-visible signal, the user may be provided with an indication (e.g. a visual spectrum pulse) or confirmation that the optical signal 1312 is being communicated for unlocking the device.

Referring back to FIG. 13, another communication example 1301 includes manual buttons 1314. The authentication process may provide a code or series of inputs to be input into the security tag to unlock. The security tag may include manual buttons that must be pressed in a certain order for unlocking the tag. The buttons could be numbers, letters, or any other symbols. The authentication process provides an indication of the proper buttons to be entered in the security tag to be unlocked. In an alternative embodiment, the manual buttons may include a combination lock or other styles of lock that require a physical or manual input for unlocking. For example, there may be a sequence of rotatable mechanisms, such as those found on a combination lock, that can be used to input an unlock code.

Another communication example 1301 includes a key 1316. Rather than manual buttons, there may be a key that is input or used on the security tag. The key may be electronic, or there may be a physical key that is used for unlocking the device.

FIG. 14 illustrates examples 1401 in which a device can be disabled with improper removal of a security tag. FIG. 13 illustrated examples for communicating the unlocking of a security tag. The unlocking of a security tag is also referred to as authentication and may include age verification as described below. If the security tag is not authenticated or unlocked, then attempts at removing the security tag may disable or compromise the device as illustrated by examples 1401. In some embodiments, the user may be allowed a certain number of attempts at unlocking the security tag before the security tag disables the device. In one embodiment, a single incorrect attempt to unlock the security tag, while in other embodiments, the user may be allowed to try to unlock the security tag multiple times.

One example 1401 for disabling the device includes pulling connection pins 1402. In one embodiment, the security tag is disposed at the connection port for receiving a cartridge. Attempts to remove the security tag without unlocking results in various connection pins being bent, broken, or removed. In one example, there are power pins (e.g., pogo pins) in the device for transmitting power and one or more of those pins are attached to the security tag unless the security tag is unlocked. The connection pins 1402 may also include pins for receiving charge (e.g. on an end opposite the cartridge receiving end). Attempting to remove the security tag damages pins, which prevent the device from being charged.

Another example 1402 for disabling the device includes depositing a substance 1404 on or within the device. The substance 1404 could coat any of the connections to prevent a proper connection. The substance 1404 may be a caustic substance that ruins components of the device but is not harmful to humans. Another example of the substance would be a jelly or an e-liquid that covers connections or ruins other components to prevent operation. Another example could include a non-conductive ink or other non-conductive coating that could be applied to one or more power contacts to inhibit the flow of current (e.g., from the control body 102 to the cartridge 104).

Another example 1402 for disabling the device includes blocking airflow 1406. The security tag may include a piece or component that blocks airflow and/or pressure drop communication (e.g., a channel permitting fluid communication between a pressure sensor and the device airflow channel so as to inhibit the pressure sensor from sensing pressure drop that may otherwise result in activation of the device in some embodiments) within the device. Removal of the security tag without unlocking can leave the piece or component blocking airflow. Alternatively, the air channel may be collapsed by attempted removal of the security tag. In another embodiment, the substance 1404 may be released to block airflow 1406.

Another example 1402 for disabling the device includes causing a system short 1408. Improper removal can result in a system short. The system short 1408 may be detected by the main controller which can then disable operation because of the presence of the system short. A substance can be added that results in a short or a physical adjustment to the components can result in a short. Another example 1402 for disabling the device includes causing an obstruction 1410. The obstruction 1410 may include an obstruction to the air channel, or may include obstructing the liquid transfer in the device. In another example, the mouthpiece or other components may be crimped or closed when the security tag is improperly removed.

FIG. 17 is a diagram showing a security tag process according to one embodiment. In block 1702, a purchase of the device is made. In block 1704, the device includes a security tag with a serial number of AB123. The serial number may be unique to the security tag and authorized removal of the security tag requires the serial number. In block 1706, the security tag is connected with a power cable or is provided a power source. As discussed above, there are several communication mechanisms with the security tag that may require power. In block 1708, the user can go online for the authorization process. In block 1710, the user's age is verified. The age verification process of various embodiments is discussed further below with respect to FIGS. 19-21 and is further described in U.S. patent application Ser. No. 16/415,460, entitled "AUTHENTICATION AND AGE VERIFICATION FOR AN AEROSOL DELIVERY DEVICE," filed on May 17, 2019, which is herein incorporated by reference.

The age verification process may include visiting a website and providing the security tag serial number and identification information (e.g. phone number) in block 1712. As a result, a code or other form of communication (e.g. communication 1301) can be provide to the user in block 1714. The provided communication can then be used in block 1716 to communicate with the security tag. When the security tag receives the correct communication, the security tag can be unlocked and removed in block 1718. If the communication with the security tag is not correct or if the user attempts to remove the security tag without authenticating or unlocking, then the device is disabled as shown in block 1720. In some embodiments, the security tag may be reusable. For example, at a retail point of sale, there may be a kiosk or an employee that can perform the age verification through methods described below. Based on this verification, the security tag may be removed and maintained at the retail location where it can be applied to other products.

FIG. 18 is a diagram showing a security tag process according to another embodiment. FIG. 18 is similar to the embodiment in FIG. 17, except the security tag in FIG. 18 covers the entire device or both ends, whereas the security tag in FIG. 17 is just on one end of the device. In block 1802, a purchase of the device is made. In block 1804, the device includes a security tag with a serial number of AB123. The serial number may be unique to the security tag and authorized removal of the security tag requires the serial number. In block 1806, the security tag is connected with a power cable or is provided a power source. As discussed above, there are several communication mechanisms with the security tag that may require power. In block 1808, the user can go online for the authorization process. In block 1810, the user's age is verified. The age verification process is discussed further below with respect to FIGS. 19-21. The age verification process may include visiting a website and providing the security tag serial number and identification information (e.g. phone number) in block 1812. As a result, a code or other form of communication (e.g. communication 1301) can be provide to the user in block 1814. The provided communication can then be used in block 1816 to communicate with the security tag. When the security tag receives the correct communication, the security tag can be unlocked and removed in block 1818. If the communication with the security tag is not correct or if the user attempts to remove the security tag without authenticating or unlocking, then the device is disabled as shown in block 1820. In some embodiments, the user may be allowed a threshold number of attempts communicating with the security tag and the disabling of the device only occurs after the threshold number of failed attempts is reached. In other embodiments, the number of attempts may be within a set time period, so that other attempts at a later time do not count towards the threshold number of attempts.

FIG. 19 illustrates a system diagram for age verification with a security tag 1904. The security tag 1904 may be referred to as a security mechanism and secures a device 1906 to prevent usage with verification. The device 1906 may be any electronic nicotine delivery systems ("ENDS") device including an aerosol delivery device as described above. Verification is through an age verification system 1902. Unlocking the security tag 1904 may require a verification from the age verification system 1902, which can verify the user's age. As described, the age verification system 1902 may not only verify an age (e.g. for an age restricted product), but may also provide authentication or user identification (e.g. for an actual purchase or to prevent theft). There may be other verification mechanisms other than just for age. For example, in some embodiments, user identification may be performed in lieu of age verification.

FIG. 20 illustrates another embodiment of the age verification system 1902 connected over a network 2003 with a host 2005. FIG. 20 illustrates an embodiment in which the age verification system 1902 is coupled with the security tag 2004 (which may be the same as or different from the security tag 1904) over a network 2003 through a host device 2005. The security tag 2004 may be powered from a power supply 2008, which may also provide power to the host 2005 or device 2006. The power supply 2008 can be any power providing mechanism, such as a power outlet, or another device that provides power such as a computer, laptop, mobile device, phone, tablet, or a wireless power source.

The host 2005 may be any computing device, such as a smartphone, tablet, or computer. The security tag 2004 may receive communication from the host 2005, which may provide the ability to unlock the security tag 2004 if the age verification is satisfied. In some embodiments, the host 1605 may act as or be the power supply 2008. In other words, there may not be a separate power supply 2008 because the host 2005 of some example embodiments can provide power to the security tag 2004.

The present disclosure contemplates a computer-readable medium that includes instructions or receives and executes instructions responsive to a propagated signal, so that a device connected to a network can communicate voice, video, audio, images or any other data over a network. The age verification system 1902 may provide the instructions over the network via one or more communication ports. The communication port may be created in software or may be a physical connection in hardware. The connection with the network may be a physical connection, such as a wired Ethernet connection or may be established wirelessly as discussed below. Likewise, the connections with other components may be physical connections or may be established wirelessly. In addition to the age verification system 1902, the device 1906/2006, and/or the host 2005 may communicate through a network, including but not limited to the network 2003.

The network (e.g. the network 2003) may couple devices so that communications may be exchanged, such as between the security tag 2004 and the age verification system 1902, including between other wireless devices coupled via a wireless network, for example. As described a cluster of machines storing data to be analyzed may be connected over one or more networks, such as the network 2003. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. In one example, Blockchain technology may be employed in the network for distributing data over a network. Exemple Blockchain network functionality is described in the U.S. patent application Ser. No. 16/415,477, entitled "DECENTRALIZED IDENTITY STORAGE FOR TOBACCO PRODUCTS", filed on May 17, 2019, which is herein incorporated by reference. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple devices, such as the security tag 2004 (and/or the host 2005) and the age verification system 1902. The network 2003 may include a wireless network and may employ stand-alone ad-hoc networks, mesh networks, Wireless LAN (WLAN) networks, wireless wide area network (WWAN), wireless metropolitan area network (WMAN), cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, 4G, 5G, or future iterations) cellular technology, or the like. A network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, Zigbee, Z Wave, IEEE 802.16 (e.g., WiMax) and/or other WWAN/WMAN technology, or the like, including future iterations of any of the aforementioned technologies. A wireless network may include virtually any type of wireless communication mechanism by which signals may be communicated between devices, such as the security tag 2004 (and/or the host 2005) and the age verification system 1902, between or within a network, or the like. In some embodiments, the communication protocols listed above may be used for communication between the security tag 2004 and the host 2005, and the host 2005 then communicates with the age verification system 1902 through the same or different communication protocols.

Signal packets communicated via a network, such as the network 2003 or a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address. This signal packet communication may be applicable to the data communication between any components shown in FIG. 20.

The age verification system 1902 may include a database that tracks users along with ages. It may be encrypted and/or use anonymous identifiers (e.g. numbers, letters, or any alphanumeric identifiers) for each user. FIG. 21 describes how the age verification may occur (e.g. identification documentation 2106) and that may be stored in the database, so all future age verification requests by that user are confirmed. Specifically, once a user is age verified as confirmed in the age verification system database, future verifications (i.e. "authentications") may be merely calls to this database for unlocking the device 1906.

FIG. 21 illustrates verification examples 2101 from the age verification system 1902. As described, age verification is a process by which a user's age is verified. The age verification system 1902 provides functionality for verifying the age of a user. The age verification may be for each security tag even when a user has multiple devices 1906, 2006. The verification examples 2101 are example mechanisms to verify the user's age. The age verification system 1902 may require some identification documentation 2106 to establish the age of a user. For example, a driver's license or passport may be uploaded to establish a user's age. The image from that documentation may be used for future age verification by performing facial recognition 2108 using that image. Facial recognition 2108 technology can analyze the two images to either confirm identity match, reject identity verification, or flag the verification to request additional identification information. This authentication may include comparing that image to a live self-image ("selfie") or video that the user takes with their mobile device or webcam. This may prevent fraud of merely showing a picture of someone. The selfie image that the user uploads can also be checked for liveliness by recording a short video to ensure that the frames change. In alternative embodiments, the authentication step may include an audible input from the user, such as recitation of a number, sequence, or code to verify liveliness.

In alternative embodiments, the verification step may include an audible input from the user, such as recitation of a number, sequence, or code to verify liveliness. Another verification example 2101 includes a help desk 2107 phone call in which a user can confirm identity by providing or confirming user information (e.g. name, birth date, social security number, phone number, email, address, and/or a password, such as mother's maiden name). In one embodiment, the help desk 2107 can be used to confirm information provided in the identification document 2106. Other verification examples 2101 include fingerprints 2110 where a fingerprint reader is used for verifying the user after that user has been age verified. In one embodiment, the host 2005 from FIG. 20 may receive the fingerprint that is used for unlocking the security tag 2004. Other than facial recognition 2109 and fingerprints 2110, there may be other biometrics 2112 that are used for verifying a user, such as DNA, blood, or other biological indicators. As a further example, pin codes 2114 may be used for authenticating a user. A pin code may include a password that is associated with the user and used for unlocking the security tag 2004. The pin code may include a button in which a certain code must be entered or may include different sensors for detecting a unique interaction. For example, the pin code may further include a puff code in which a pattern of puffing is used for verification and is measured by a pressure sensor.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1-21 or as otherwise described above may be included in an aerosol delivery device according to the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   an age verification system configured to verify an age of a user;
   an aerosol delivery device that provides aerosol to the user; and
   a security tag attached to a control body of the aerosol delivery device and configured to prevent usage of the aerosol delivery device unless the security tag is unlocked and removed from the aerosol delivery device, wherein the security tag is unlocked based on a verification from the age verification system.

2. The system of claim 1, wherein the security tag is configured to disable the aerosol delivery device when the security tag is removed without being unlocked.

3. The system of claim 2, wherein the disabling is caused by exceeding a threshold number of attempts at removing the security tag without being unlocked.

4. The system of claim 1, wherein the aerosol delivery device is unchanged by adding the security tag.

5. The system of claim 1, wherein the security tag is unlocked based on receiving a communication for the verification.

6. The system of claim 5, wherein the communication comprises at least one of a Bluetooth, near field communication (NFC), radio frequency identification (RFID), bar code, audio signal, optical signal, manual buttons, or a key.

7. A system comprising:
   an age verification system configured to verify an age of a user;
   an aerosol delivery device that provides aerosol to the user; and
   a security tag configured to prevent usage of the aerosol delivery device unless the security tag is unlocked, wherein the security tag is unlocked based on a verification from the age verification system;
   wherein the security tag is configured to disable the aerosol delivery device when the security tag is removed without being unlocked;
   wherein the security tag is configured to disable the aerosol delivery device when the security tag is removed without being unlocked;
   wherein the disabling comprises at least one of breaking a connection pin, blocking an airflow, coating a connection pin, or causing a short.

8. A secured aerosol delivery device comprising:
   a cartridge providing a substance to be vaporized;
   a control body configured to be coupled with the cartridge for vaporizing the substance from the cartridge; and a security tag attached to the control body, the security tag being configured to secure the control body and prevent usage of the aerosol delivery device unless the security tag is unlocked and removed from the control body.

9. The aerosol delivery device of claim 8, wherein the security tag is configured to secure a connection portion of the control body to prevent connection with the cartridge unless the security tag is unlocked.

10. The aerosol delivery device of claim 9, wherein the control body is disabled when the security tag is removed without being unlocked.

11. The aerosol delivery device of claim 8, wherein the control body is unmodified by a presence of the security tag.

12. The aerosol delivery device of claim 8, wherein the security tag is unlocked based on receiving a communication.

13. The aerosol delivery device of claim 12, wherein the communication is based on verifying a user.

14. The aerosol delivery device of claim 13, wherein the verifying comprises verifying an age of the user.

15. The aerosol delivery device of claim 13, wherein the communication comprises at least one of a Bluetooth, near field communication (NFC), radio frequency identification (RFID), bar code, audio signal, optical signal, manual buttons, or a key.

16. A secured aerosol delivery device comprising:

a cartridge providing a substance to be vaporized;

a control body configured to be coupled with the cartridge for vaporizing the substance from the cartridge; and a security tag configured to secure the control body and prevent usage of the aerosol delivery device unless the security tag is unlocked;

wherein the control body is disabled when the security tag is removed without being unlocked;

wherein the disabling comprises at least one of breaking a connection pin, blocking an airflow, coating a connection pin, or causing a short.

17. A secured aerosol delivery device comprising:

a cartridge providing a substance to be vaporized;

a control body configured to be coupled with the cartridge for vaporizing the substance from the cartridge; and a security tag attached to the cartridge, the security tag being configured to secure the cartridge and prevent usage of the aerosol delivery device unless the security tag is unlocked and removed from the cartridge.

18. The aerosol delivery device of claim 17, wherein the security tag is configured to secure a connection portion of the cartridge to prevent connection with the control body unless the security tag is unlocked.

19. The aerosol delivery device of claim 18, wherein the cartridge is disabled when the security tag is removed without being unlocked.

20. The aerosol delivery device of claim 17, wherein the cartridge is unmodified by a presence of the security tag.

21. The aerosol delivery device of claim 17, wherein the security tag is unlocked based on receiving a communication.

22. The aerosol delivery device of claim 21, wherein the communication is based on verifying a user.

23. The aerosol delivery device of claim 22, wherein the verifying comprises verifying an age of the user.

24. The aerosol delivery device of claim 23, wherein the communication comprises at least one of a Bluetooth, near field communication (NFC), radio frequency identification (RFID), bar code, audio signal, optical signal, manual buttons, or a key.

25. A secured aerosol delivery device comprising:

a cartridge providing a substance to be vaporized;

a control body configured to be coupled with the cartridge for vaporizing the substance from the cartridge; and a security tag attached to the cartridge, the security tag being configured to secure the cartridge and prevent usage of the aerosol delivery device unless the security tag is unlocked and removed from the cartridge wherein the security tag is configured to secure a connection portion of the cartridge to prevent connection with the control body unless the security tag is unlocked;

wherein the cartridge is disabled when the security tag is removed without being unlocked;

wherein the disabling comprises at least one of breaking a connection pin, blocking an airflow, coating a connection pin, or causing a short.

* * * * *